(12) United States Patent
Goodworth et al.

(10) Patent No.: US 12,449,723 B2
(45) Date of Patent: *Oct. 21, 2025

(54) CAMERA LENS TO OPTICAL INSTRUMENT CONNECTOR

(71) Applicant: OLLIN, INC., Shelley, ID (US)

(72) Inventors: Nathan Goodworth, Shelley, ID (US); Paul Wadsworth, Albuquerque, NM (US)

(73) Assignee: MAGSCOPE, LLC., Shelley, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,637

(22) Filed: Nov. 19, 2024

(65) Prior Publication Data

US 2025/0076743 A1    Mar. 6, 2025

Related U.S. Application Data

(63) Continuation of application No. 17/824,825, filed on May 25, 2022, now Pat. No. 12,147,150.

(60) Provisional application No. 63/210,308, filed on Jun. 14, 2021.

(51) Int. Cl.
*G03B 17/56* (2021.01)
*G02B 23/16* (2006.01)

(52) U.S. Cl.
CPC .......... *G03B 17/565* (2013.01); *G02B 23/16* (2013.01)

(58) Field of Classification Search
CPC .... A61B 5/0077; G02B 21/362; G02B 15/06; G02B 7/14
See application file for complete search history.

(56) References Cited

U.S. PATENT DOCUMENTS

| | | | |
|---|---|---|---|
| 9,106,816 B1 | 8/2015 | Hotter | |
| 12,147,150 B2 * | 11/2024 | Goodworth | G03B 30/00 |
| 2005/0024605 A1 * | 2/2005 | Hamada | G03B 21/54 |
| | | | 353/119 |
| 2014/0072362 A1 * | 3/2014 | Hyers | F16M 13/02 |
| | | | 403/24 |
| 2014/0362283 A1 | 12/2014 | Coppage et al. | |
| 2015/0054935 A1 | 2/2015 | Muramatsu | |
| 2016/0105593 A1 | 4/2016 | Amino et al. | |
| 2019/0171023 A1 | 6/2019 | Carlvik et al. | |

(Continued)

OTHER PUBLICATIONS

Canadian Patent Application No. 3,222,352, Examination Search Report mailed on Feb. 5, 2025.

*Primary Examiner* — Noam Reisner
(74) *Attorney, Agent, or Firm* — Kunzler Bean & Adamson

(57) ABSTRACT

Apparatuses, systems, and methods are disclosed for a camera lens to optical instrument connector. An apparatus includes a tab having a tab body comprising a first side, a second side, and an aperture, one or more magnets located within the tab body, and a means for connecting the first side to a device such that a camera lens of the device is aligned with the tab aperture. The apparatus includes an adapter having an adapter body comprising a first side, a second side, and an aperture, one or more magnets positioned within the adapter body, the one or more adapter magnets aligned with the one or more tab magnets for magnetically securing the tab to the adapter, and an adapter sidewall protruding along an axis perpendicular to an edge of the first side for securing the adapter onto an eyepiece of a lensed optical instrument.

20 Claims, 39 Drawing Sheets

(56) References Cited

U.S. PATENT DOCUMENTS

| | | | |
|---|---|---|---|
| 2020/0019042 A1* | 1/2020 | Crispin | G03B 17/565 |
| 2020/0028995 A1* | 1/2020 | Jain | G02B 21/20 |
| 2020/0237310 A1* | 7/2020 | Lozano-Buhl | A61B 5/0077 |
| 2022/0299748 A1* | 9/2022 | Scovil | G03B 17/566 |

* cited by examiner

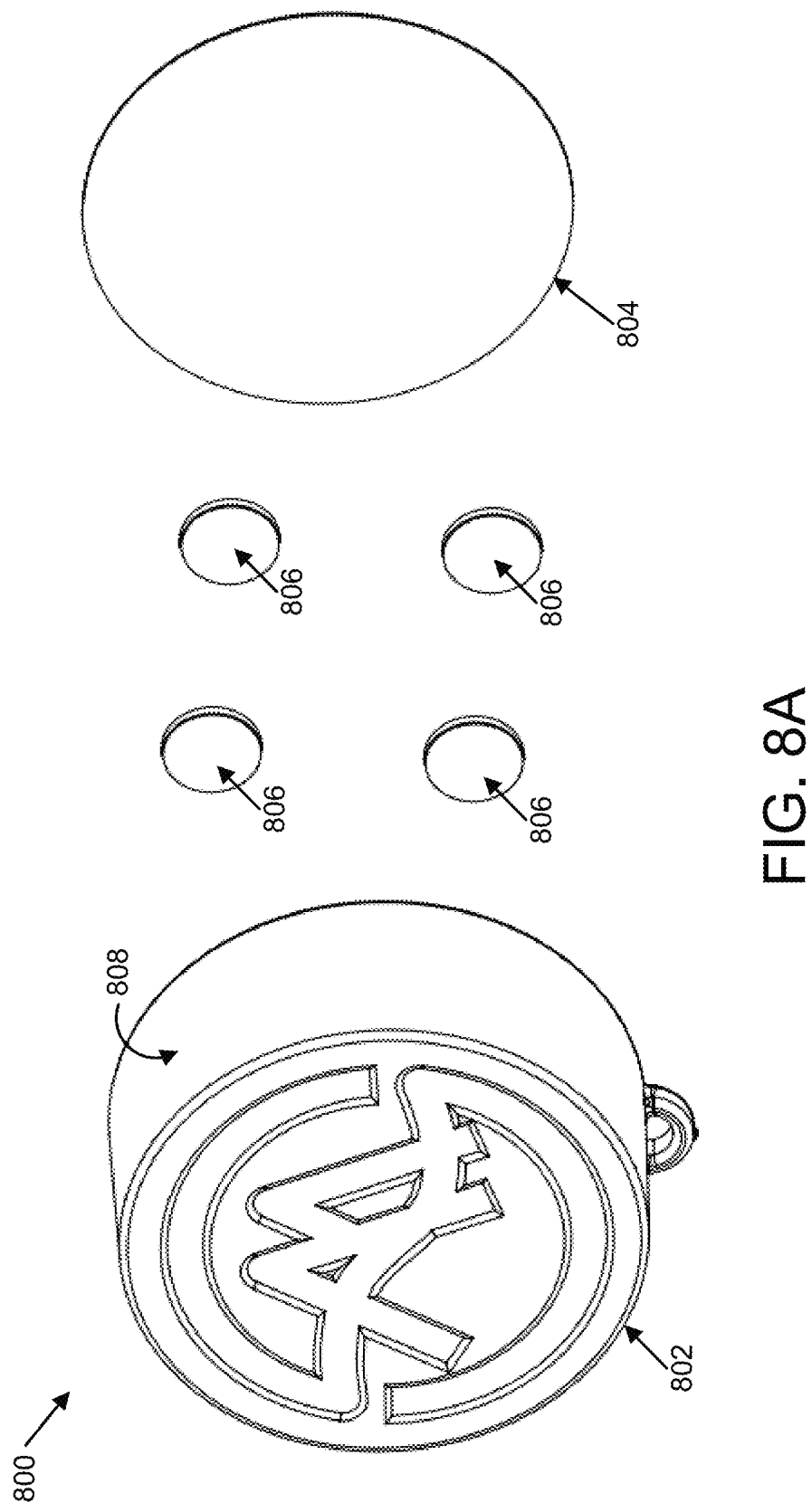

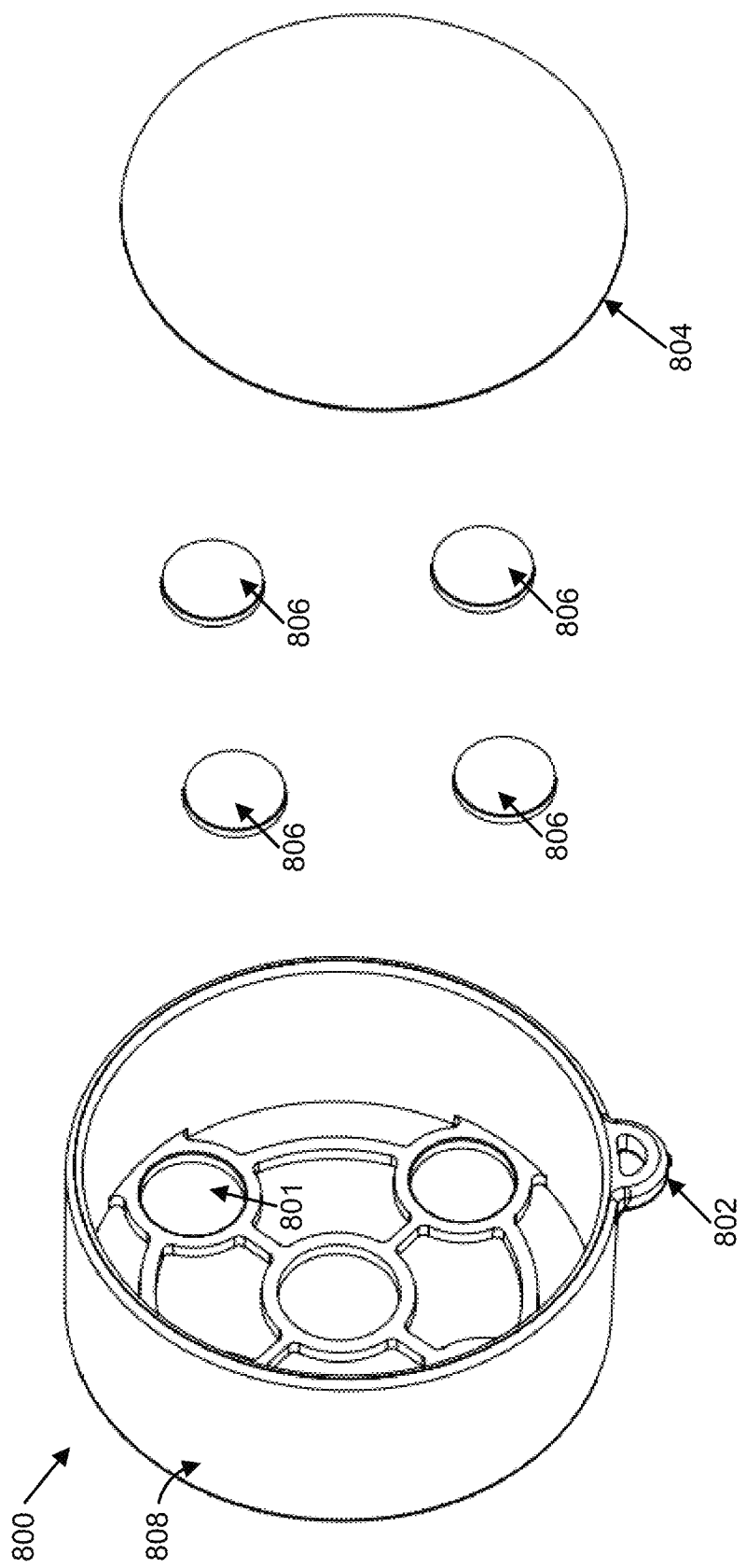

CAMERA LENS TO OPTICAL INSTRUMENT CONNECTOR

CROSS REFERENCE TO RELATED APPLICATIONS

This application is a continuation of U.S. patent application Ser. No. 17/824,825 entitled "CAMERA LENS TO OPTICAL INSTRUMENT CONNECTORS", which was filed on May 25, 2022, for Nathan Goodworth, et al., which claims the benefit of U.S. Provisional Patent Application No. 63/210,308 entitled "CAMERA LENS TO OPTICAL INSTRUMENT CONNECTOR" and filed on Jun. 14, 2021, for Nathan Goodworth, et al., which is incorporated herein by reference.

FIELD

This invention relates to camera attachments and more particularly relates to a connector between a camera lens and an optical instrument.

BACKGROUND

Digiscoping is an activity that utilizes a phone or other device equipped with a digital camera to capture images or videos through an optical instrument, such as telescopes or spotting scopes. Outdoor enthusiasts, hunters, bird watchers, astronomers, and more make use of digiscoping. To digiscope, a secure and properly aligned connection must be made between the digital camera and the optical instrument.

SUMMARY

In one embodiment, an apparatus includes a tab comprising a tab body comprising a first side, a second side, and an aperture through the first side and the second side, one or more magnets located within the tab body positioned between the first side and the second side, and a means for connecting the first side to a device such that a camera lens of the device is aligned with the tab aperture. In one embodiment, the apparatus includes an adapter comprising an adapter body comprising a first side, a second side, and an aperture through the first side and the second side, one or more magnets positioned within the adapter body, the one or more adapter magnets aligned with one or more tab magnets for magnetically securing the tab to the adapter, and an adapter sidewall protruding along an axis perpendicular to an edge of the first side for securing the adapter onto an eyepiece of a lensed optical instrument such that the lens of the optical instrument is aligned with the adapter's aperture.

In one embodiment, a system includes a tab comprising a tab body comprising a first side, a second side, and an aperture through the first side and the second side, one or more magnets located within the tab body positioned between the first side and the second side, and a means for connecting the first side to a device such that a camera lens of the device is aligned with the tab aperture. In one embodiment, the system includes an adapter comprising an adapter body comprising a first side, a second side, and an aperture through the first side and the second side, one or more magnets positioned within the adapter body, the one or more adapter magnets aligned with the one or more tab magnets for magnetically securing the tab to the adapter, and an adapter sidewall protruding along an axis perpendicular to an edge of the first side for securing the adapter onto an eyepiece of a lensed optical instrument such that the lens of the optical instrument is aligned with the adapter's aperture.

In one embodiment, the system includes a cap comprising a cap body configured to cover the first side of the adapter, the cap body comprising an exterior surface and an interior surface and a cap sidewall protruding along an axis perpendicular to an edge of the cap's interior surface that corresponds to the adapter sidewall such that the cap receives and conceals the adapter when connected and one or more magnets embedded within the cap body, the one or more cap magnets aligned with the one or more adapter magnets to magnetically secure the cap to the adapter.

In one embodiment, a digiscoping system includes a tab comprising a tab body comprising a first side, a second side, and an aperture through the first side and the second side, the first side comprising a plurality of snaps to connect with corresponding snap receiving means positioned on a device, the device comprising more snap receiving means than the plurality of snaps on the first side of the tab such that the tab may be attached to the device at various positions corresponding to different cameras of the device and one or more magnets located within the tab body positioned between the first side and the second side.

In one embodiment, the digiscoping system includes an adapter comprising an adapter body comprising a first side, a second side, and an aperture through the first side and the second side, one or more magnets positioned within the adapter body, the one or more adapter magnets aligned with the one or more tab magnets for magnetically securing the tab to the adapter, an adapter sidewall protruding along an axis perpendicular to an edge of the first side for securing the adapter onto an eyepiece of a lensed optical instrument such that the lens of the optical instrument is aligned with the adapter's aperture, one or more slots opposing one another in the adapter sidewall, and an adapter insert having a shape and a size that corresponds to a size of the eyepiece of the lensed optical instrument, the adapter insert comprising one or more tab elements that fit into the one or more slots in the adapter sidewall for selectively securing the adapter insert into the adapter, wherein the adapter insert is swappable with other adapter inserts to allow the adapter to couple to different sized eyepieces of lensed optical instruments without changing a size of the adapter.

In one embodiment, the digiscoping system includes a cap comprising a cap body configured to cover the first side of the adapter, the cap body comprising an exterior surface, an interior surface, and a cap sidewall protruding along an axis perpendicular to an edge of the cap's interior surface that corresponds to the adapter sidewall such that the cap receives and conceals the adapter when connected and one or more magnets embedded within the cap body, the one or more cap magnets aligned with the one or more adapter magnets to magnetically secure the cap to the adapter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8A depicts an exploded front view of one embodiment of a cap;

FIG. 8B depicts an exploded back view of one embodiment of a cap;

DETAILED DESCRIPTION

Figure 1A:
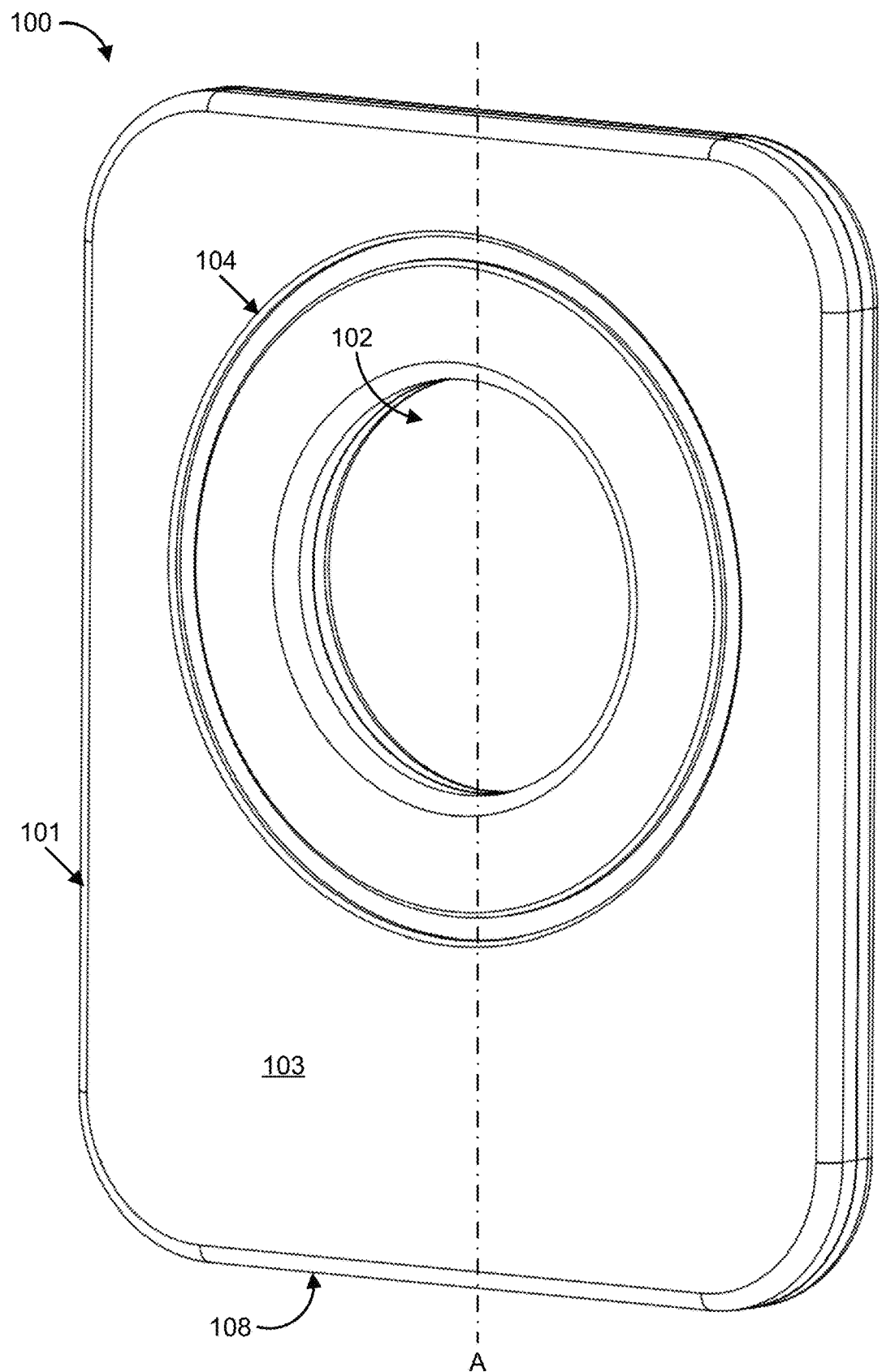
FIG. 1A depicts a front view of one embodiment of an assembled tab.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

This disclosure presents different embodiments of solutions for securely connecting a camera lens to an optical instrument such as a monocular (e.g., a spotting scope), binoculars, rifle scopes, telescopes, microscopes, and/or the like. Digiscoping, as used herein, may refer to a neologism for afocal photography, using a (digital) camera to record distant images through the eyepiece of an optical instrument.

In general, digiscoping is an activity that utilizes a phone or other device equipped with a digital camera to capture images or videos through an optical instrument, such as telescopes or spotting scopes. Outdoor enthusiasts, hunters, bird watchers, astronomers, and more make use of digiscoping. In order to digiscope, a sturdy and secure connection must be made between the digital camera and the optical instrument. There are some existing devices that help make this connection. However, existing devices have drawbacks, such as:

Cumbersome, complex, and slow to install on optical instrument;
Require tedious effort to correctly align camera lens with optical instrument each time the camera lens is connected;
Multiple moving parts increase risk of connection failure or deteriorated picture quality;
Reliance on screw systems, twist locking, and clamping technologies that require special consideration for both storage and use.

There is a need for a low profile digiscoping connection system that provides quality results with greater consistency while increasing the ease of use and ability to enter into the image capturing setup more quickly.

The embodiments disclosed herein seek to provide solutions to the foregoing problems by providing a device that, when installed, securely connects a camera lens to an optical instrument in one easy step without substantial need for tedious alignment. This device is also:

Cheap to manufacture;
User friendly;
Easy to install; and
Usable with multiple different optical instruments.

The proposed solutions describe an ecosystem that provides users with a revolutionary way to approach digiscoping. In one embodiment, the system consists of three major components including the scope adapter (hereinafter "adapter"), the phone tab (hereinafter "tab"), and the scope adapter cap (hereinafter "cap"). In one embodiment, within each of these components are embedded magnets that provide strong clamping forces and positioning capabilities to consistently align the phone in the centered position on the scope by just placing the tab near the adapter.

In one embodiment, the adapter slides over a scope eyepiece and creates a magnetic interface for the tab to connect to. The adapter is minimalistic in design and allows the user to leave it installed at all times while maintaining the ability to use the scope in its primary manner with just the human eye. In one embodiment, the tab is connected to a digital camera, with the magnetic interface centered on the digital camera. The digital camera, with attached tab, may be aligned on the scope adapter in portrait or landscape orientation while being securely fixed to the scope.

In one embodiment, when the scope is not in use, the cap can be placed over the adapter to protect the scope lens from dirt and debris. With the adapter installed and the low-profile phone tab connected to the phone case, the proposed solution provides a virtually instantaneous connection of the phone to the scope as the tab and adapter magnetically couple with the camera self-centering on the scope, ready to produce quality images and video, all while maintaining a non-intrusive and easy to install and maintain solution.

As the tab, adapter, and cap all use the same universal magnetic array system, in one embodiment, other digiscoping solutions or "phone connectors" that use the same magnetic array pattern may be compatible with the present solution.

Figure 1B:
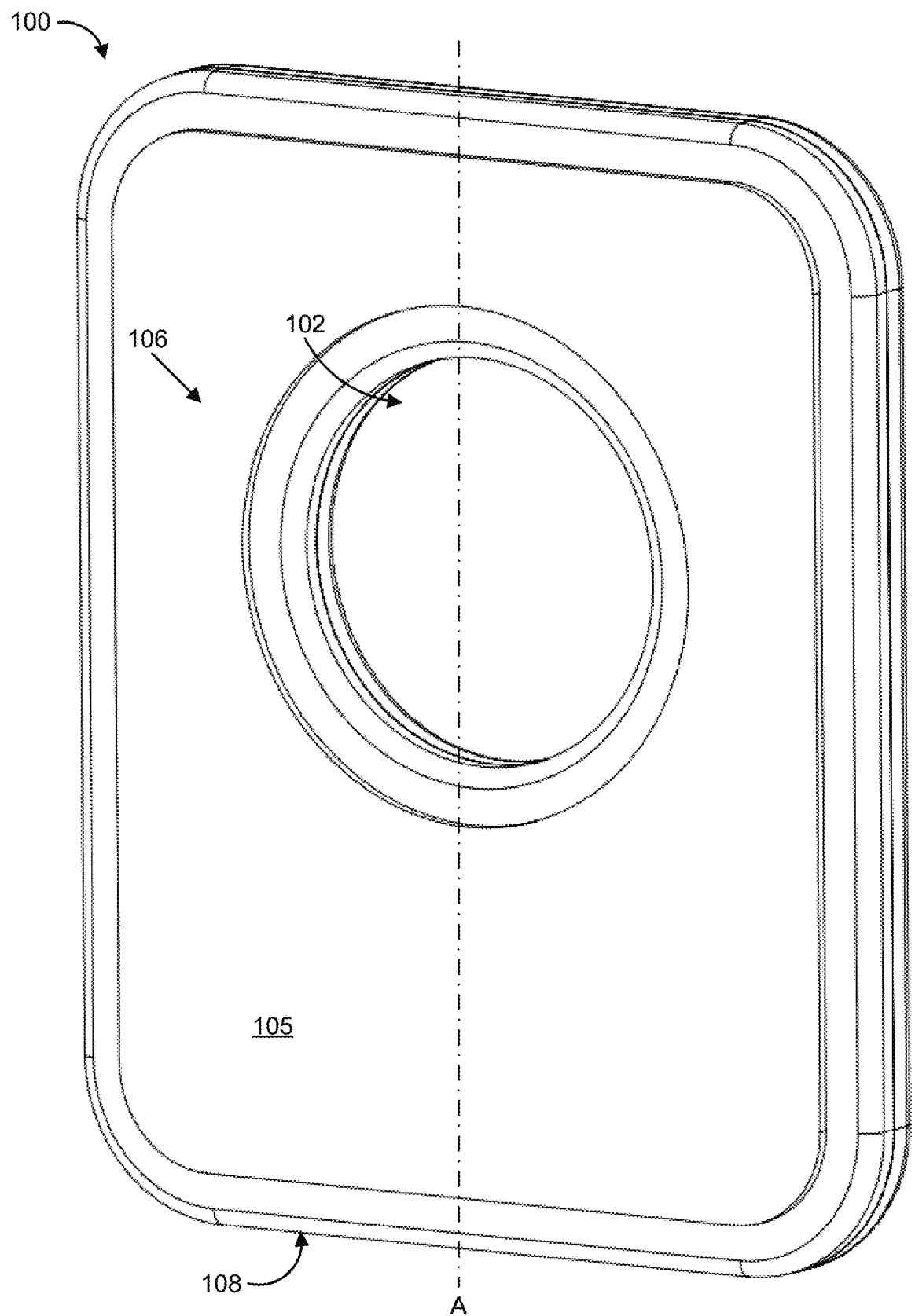
FIG. 1B depicts a back view of one embodiment of an assembled tab.

FIGS. 1A and 1B are an assembled front and back view, respectively, illustrating one embodiment of a tab 100. As used herein, a tab 100 may refer to a device of the present disclosure that attaches to at least one of a camera lens, a smartphone, or a smartphone case and couples to a corresponding adapter, described below. The tab 100, in one embodiment, includes a tab body 101, comprising a first side 103 and a second side 105, a completely contained opening or aperture 102, an engraved concentric guide ring 104, and an adhesive 106.

In one embodiment, the tab 100 forms a substantially rectangular shape. In such an embodiment, the center of the opening or aperture 102 typically lies along an axis A perpendicular to a non-corner edge 108 where the axis A substantially splits the tab 100 into two equal halves. In one embodiment, the opening or aperture 102 is a bore-type aperture, which, as used herein, may refer to a hole or opening that is round or cylindrical. In certain embodiments, the tab 100 may include multiple different apertures or openings 102 for accommodating different cameras and camera configurations.

In certain embodiments, the adhesive 106 covers at least a portion of the surface area of the second side 105 of the tab 100 while typically leaving the opening or aperture 102 uncovered. In one embodiment, the adhesive 106 is used to couple the tab 100, in particular the second side 105 of the tab 100, to a surface area connected to a camera lens, e.g., a surface of a body of a smart phone/tablet device, or the surface area of an attachment that couples to the surface area connected to a camera lens, e.g., a phone/tablet cover.

In other embodiments, the adhesive 106 may be substituted for a different method of coupling. This may include a friction fit, snap fit, a screw on fit, a magnetic force, hook and loop fasteners, or any other means of sturdy attachment, e.g., as shown in FIGS. 3C-3G.

Figure 2A:
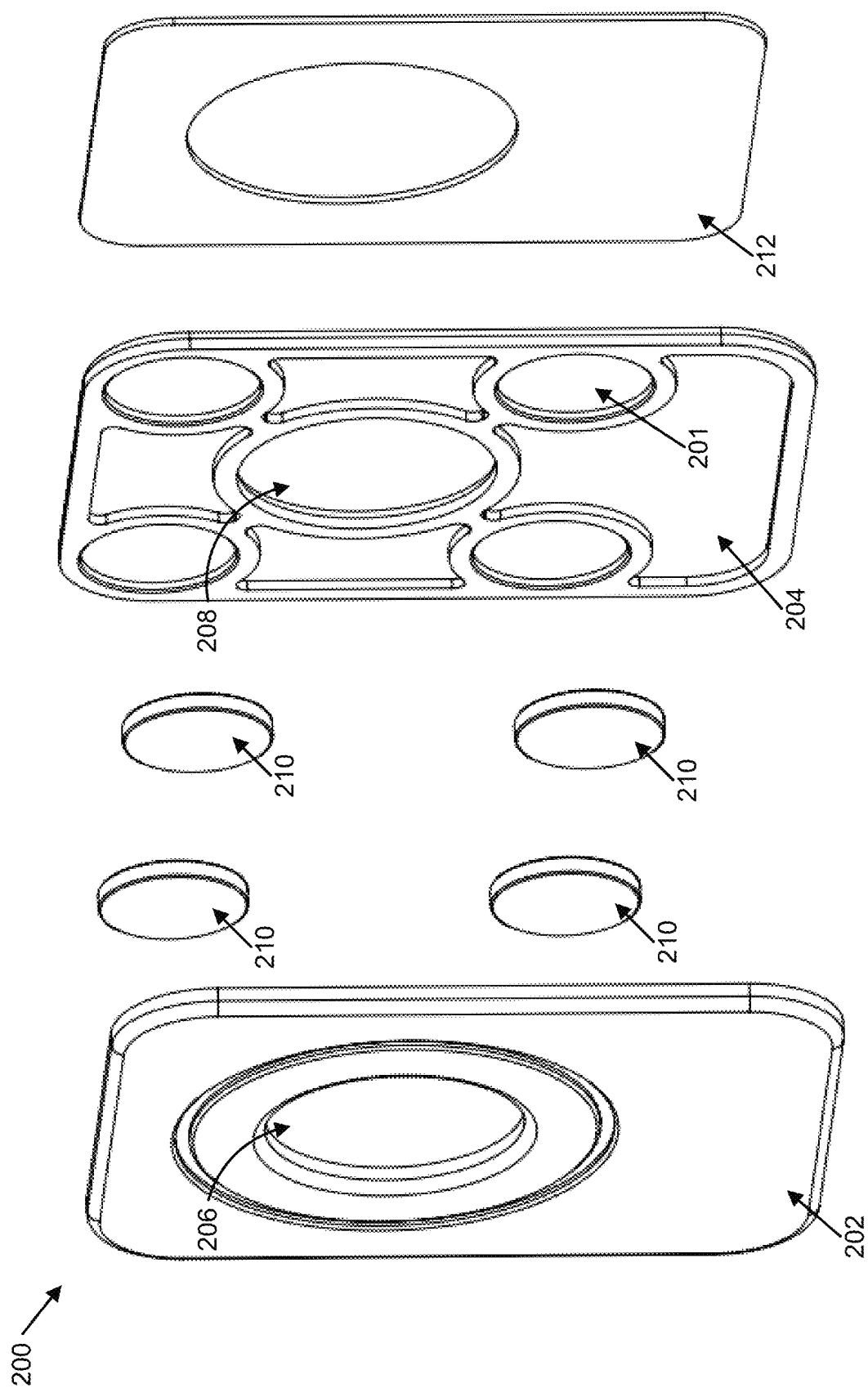
FIG. 2A depicts an exploded front view of one embodiment of a tab.
Figure 2B:
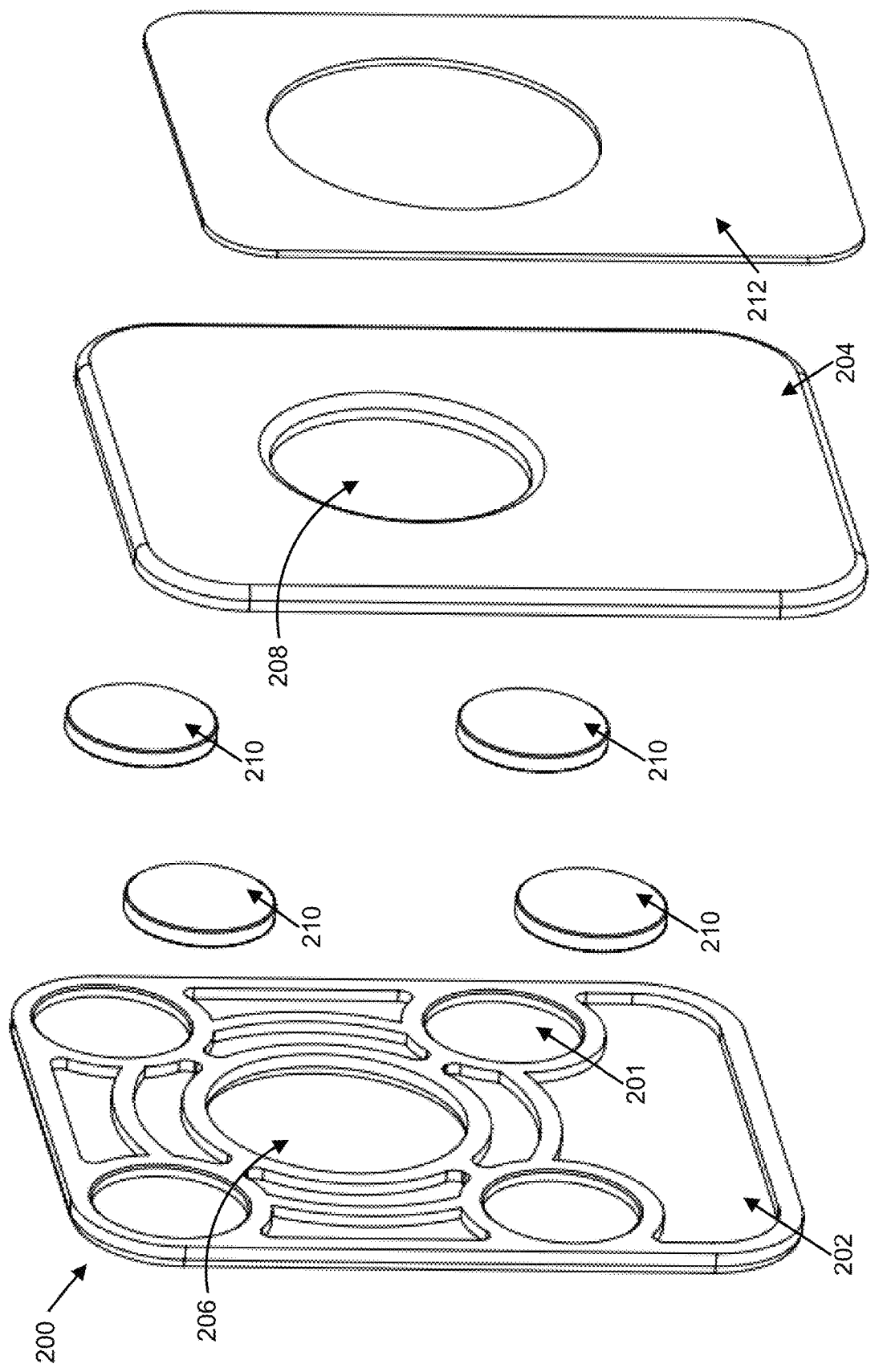
FIG. 2B depicts an exploded back view of one embodiment of a tab.

Referring to FIGS. 2A and 2B, exploded front and back views are shown, respectively, further illustrating one embodiment of a tab 200, which may be substantially similar to the tab 100 described above with reference to FIGS. 1A and 1B. The tab 200, in one embodiment, includes a first side 202 and a second side 204.

In certain embodiments, the first side 202 and the second side 204 are substantially parallel to one another, as illustrated in FIGS. 2A and 2B. When in use, the first side 202 is typically oriented towards or facing the adapter (described below with reference to FIGS. 5A and 5B) while the second side 204 is typically oriented towards or facing the camera lens.

In certain embodiments, the first side 202 contains an opening or aperture 206 that, when the first side 202 is connected to the second side 204, substantially aligns with a corresponding opening or aperture 208 in the second side 204 to create a completely contained, bore type aperture or opening through the tab 200.

In certain embodiments, magnets 210 are embedded between the first side 202 and the second side 204 of the tab 200. In one embodiment, four magnets 210 are embedded between the first side 202 and the second side 204. In other embodiments, as few as two magnets may be used, or as many as fifty magnets may be likewise embedded. In one embodiment, a single ring-shaped magnet may be placed between the first side 202 and the second side 204 that includes an aperture or opening that corresponds to the apertures 206, 208 of the tab 200. One of skill in the art will recognize, in light of this disclosure, that any number of magnets 210 may be used. In one embodiment, the tab 200 is configured to magnetically mount, connect, or attach to an external mounting device, e.g., a phone mount, a metal plate, and/or the like.

In one embodiment, the first 202 and second 204 sides are manufactured, e.g., thermoformed, to include formations 201 such as grooves, recesses, cavities, hollows, cut-outs, pockets, beds, and/or the like that correspond to a size and shape of the magnets 210 being used such that the magnets 210 are securely positioned or located between the first 202 and second 204 sides.

In certain embodiments, the adhesive 212 covers at least a portion of the second side 204 while typically leaving the opening or aperture 208—and consequentially opening or aperture 206—uncovered. The adhesive 212 is used to couple the second side 204 to a surface area connected to a camera lens, e.g., a surface of a body of a smart phone/tablet device, or the surface area of an attachment that couples to the surface area connected to a camera lens, e.g., a phone/tablet cover.

In other embodiments, the adhesive 212 may be substituted for a different method of coupling. This may include a friction fit, a snap fit, a screw on, a magnetic force, hook and loop fasteners, or any other means of sturdy attachment, e.g., as shown in FIGS. 3C-3G.

Figure 2C:
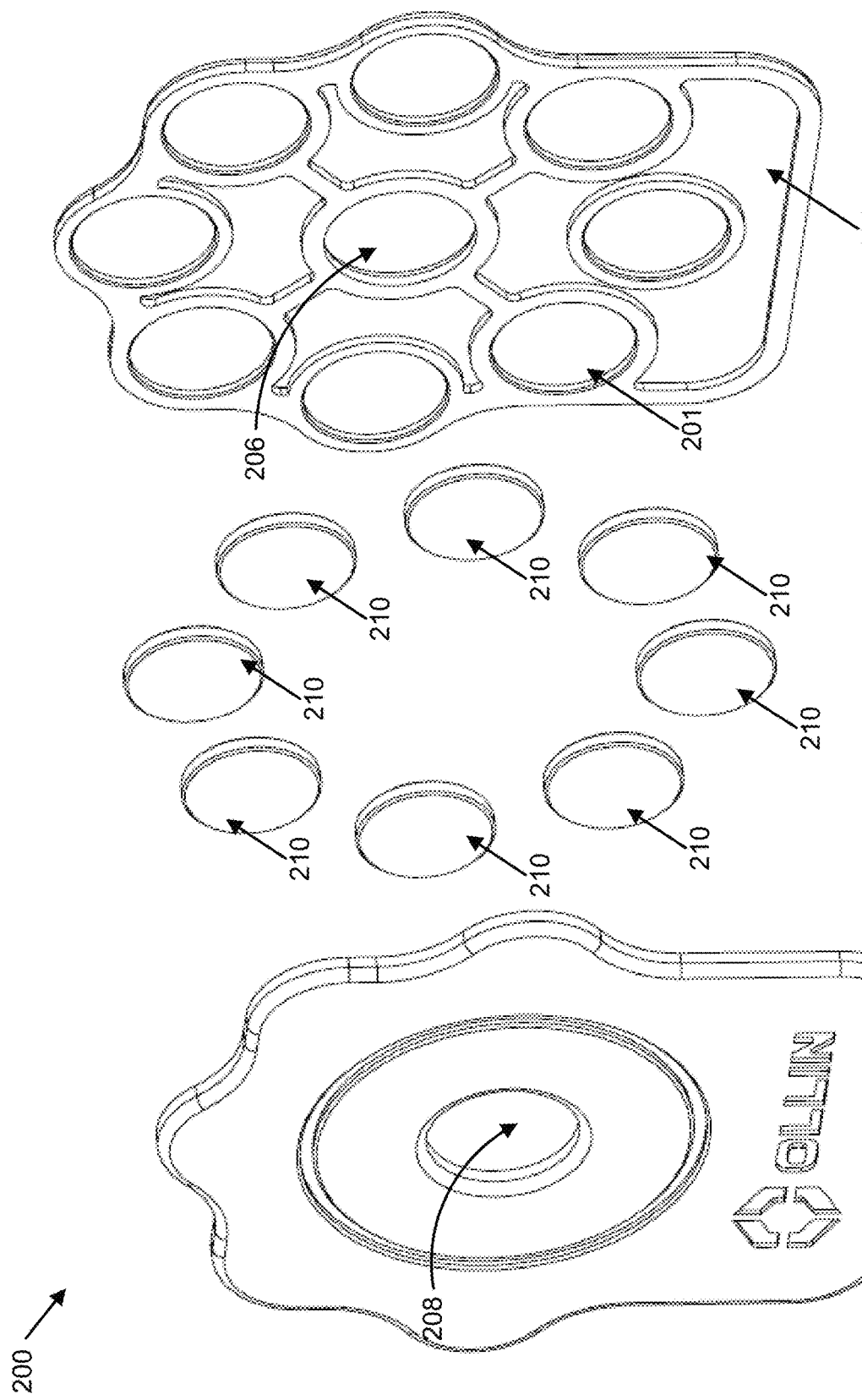
FIG. 2C depicts an exploded front view of one embodiment of a tab.
Figure 2D:
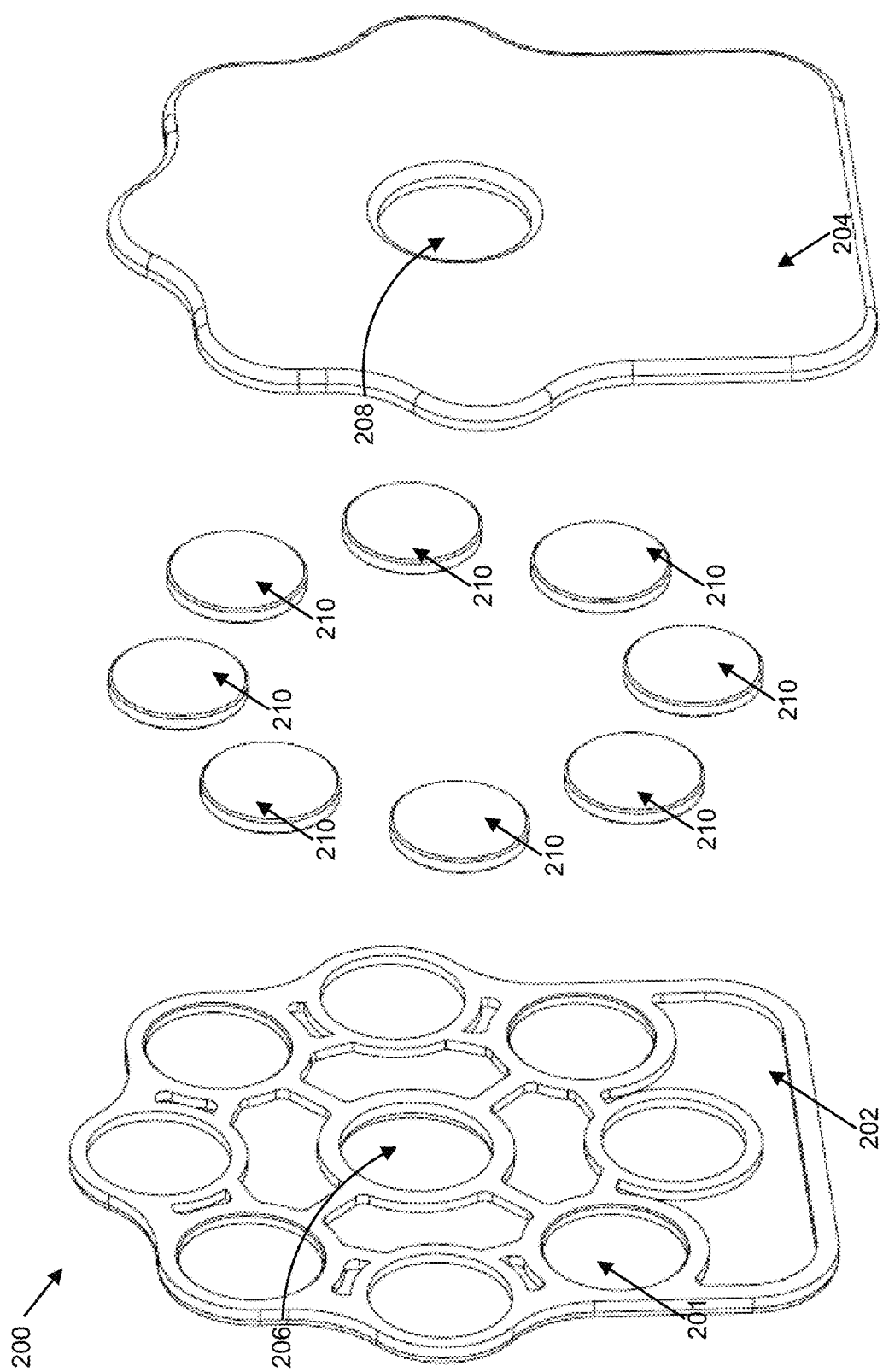
FIG. 2D depicts an exploded back view of one embodiment of a tab.

Referring to FIGS. 2C and 2D, exploded front and back views are shown, respectively, further illustrating another embodiment of a tab 200, which may be substantially similar to the tab 100 described above with reference to FIGS. 1A and 1B. The tab 200, in one embodiment, includes a first side 202 and a second side 204. In the depicted embodiment, the tab 200 includes eight magnets 210 that are positioned between the first side and the second side.

Figure 3A:
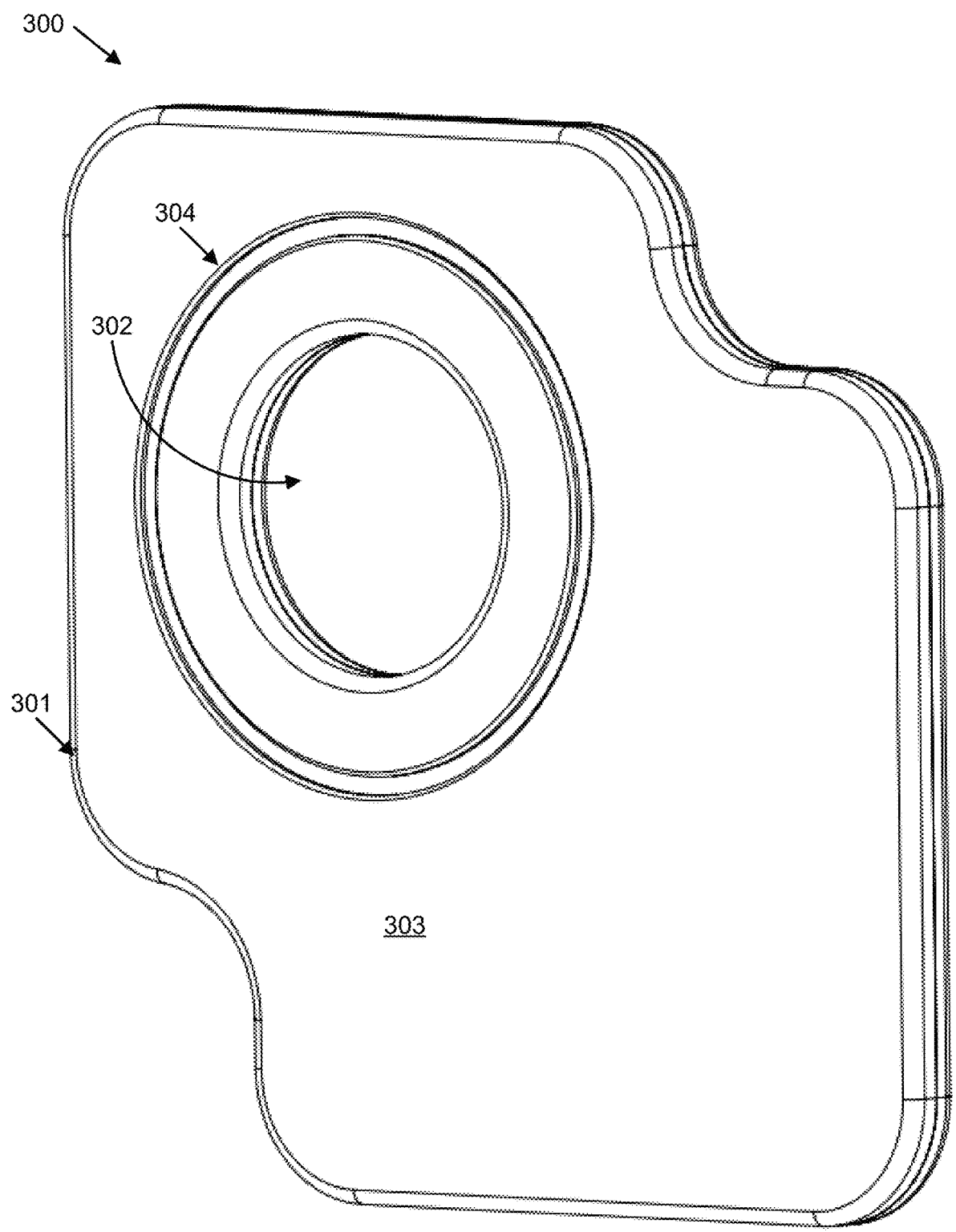
FIG. 3A depicts a front view of one embodiment of an assembled tab.
Figure 3B:
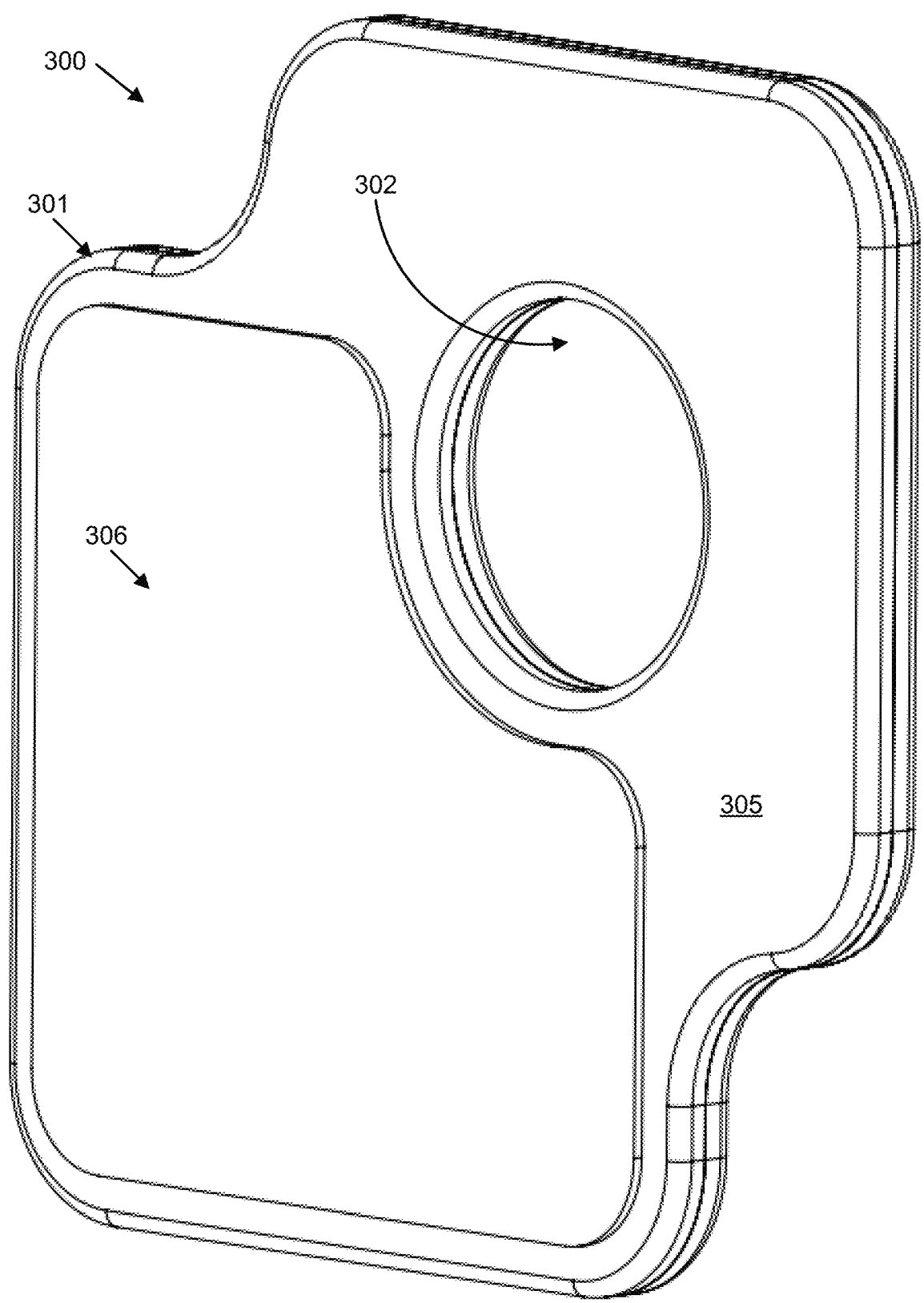
FIG. 3B depicts a back view of one embodiment of an assembled tab.

FIGS. 3A and 3B are an assembled front and back view, respectively, illustrating another embodiment of a tab 300. The tab 300 includes a tab body 301, comprising a first side 303 and a second side 305, an opening or aperture 302, an engraved concentric guide ring 304, and an adhesive 306.

In certain embodiments, the adhesive 306 covers at least a portion of the surface area of the tab 300 while typically leaving the opening or aperture 302 uncovered. The adhesive 306 is used to couple the tab 300 to a surface area connected to a camera lens, e.g., a surface of a body of a smart phone/tablet device, or the surface area of an attachment that couples to the surface area connected to a camera lens, e.g., a phone/tablet cover.

In other embodiments, the adhesive 306 may be substituted for a different method of coupling. This may include a friction fit, snap fit, screw on, magnetic force, hook and loop fasteners, or any other means of sturdy attachment.

Figure 3C:
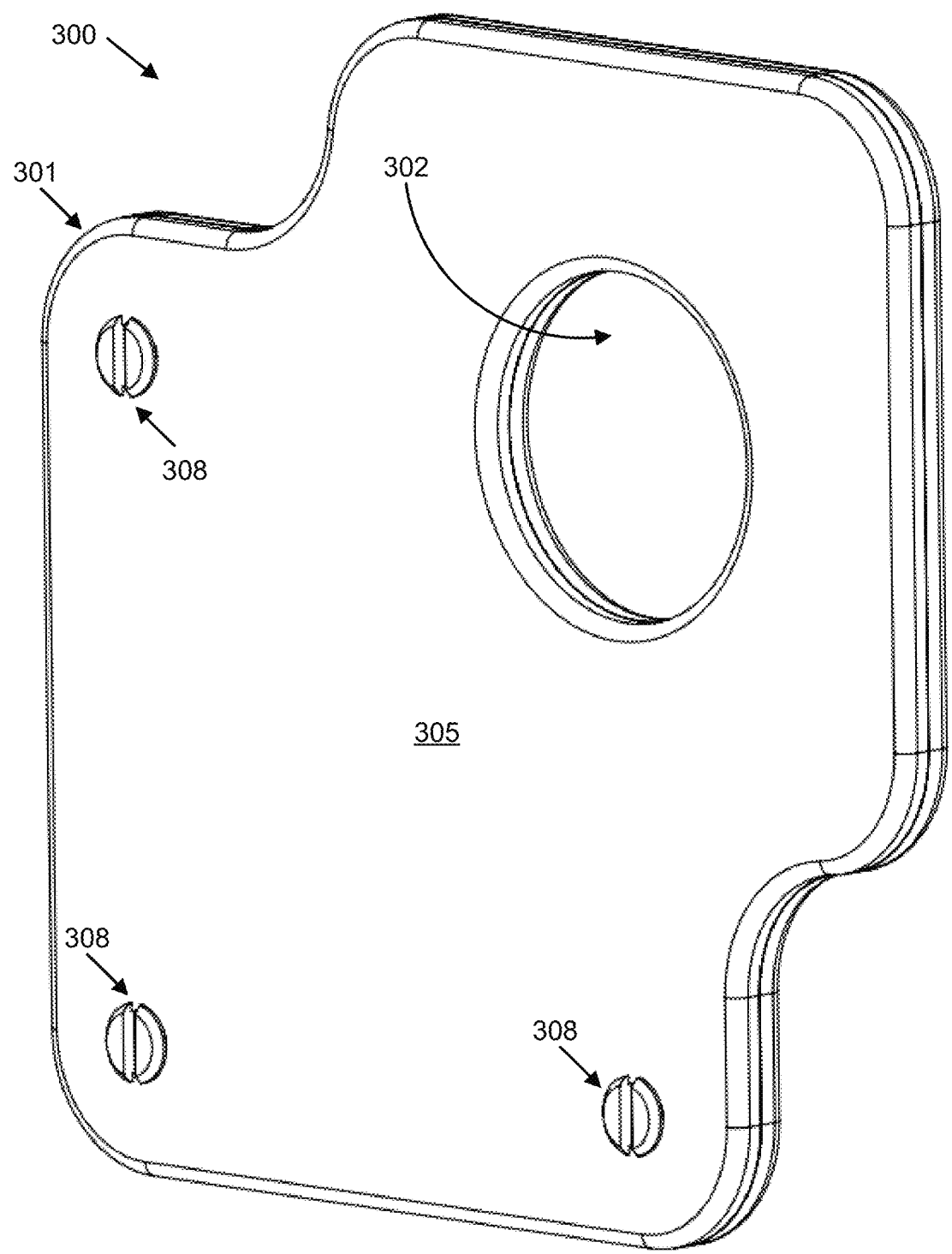
FIG. 3C depicts a back view of one embodiment of an assembled tab.

FIGS. 3C-3G illustrate an example of securing a tab 300 to a surface area connected to a camera lens using a snap fit. FIG. 3C illustrates a second side 305 of a tab 300 that includes a plurality of snaps 308. In certain embodiments, the snaps 308 may be buttons or other mechanisms for selectively attaching and detaching a tab 300 from corresponding surface, e.g., a smart phone or phone cover. The snaps 308 may be strategically placed, fixed, or located on the surface of the second side 305 to align with corresponding snap receiving means and to align the opening or aperture 302 with a camera lens on a device.

Figure 3D:
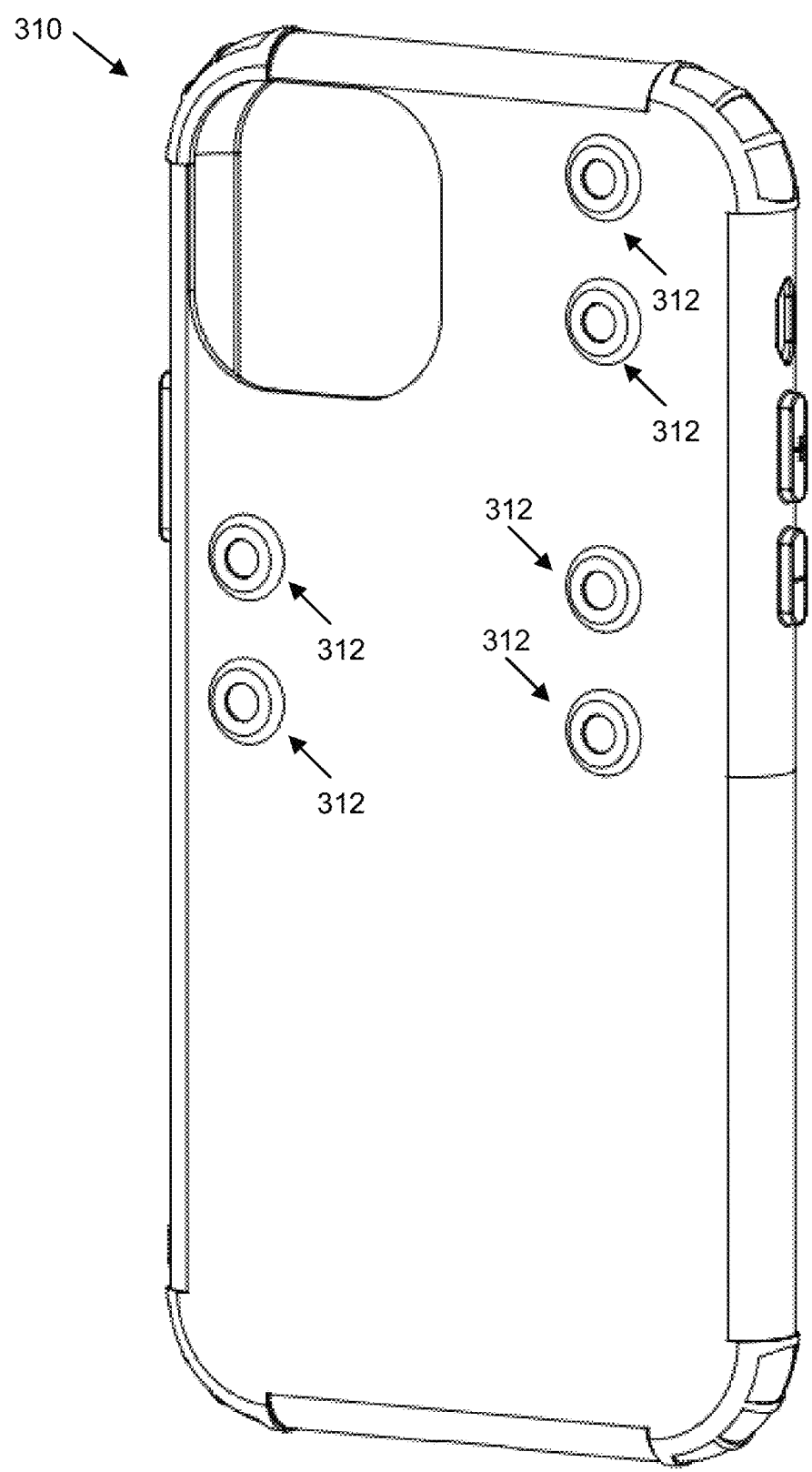
FIG. 3D depicts a back view of one embodiment of a device case.

In one embodiment, shown in FIG. 3D, a device cover 310, e.g., such as a phone case, may include snap receiving means 312 that correspond to and are configured to receive a snap 308 on a tab 300. The snap receiving means 312 may also be adhered to or located on the surface of a device, such as the surface of the phone itself. The device cover 310 may have multiple different configurations of snap receiving means 312 so that the tab can be securely coupled to the device cover 310 in different positions.

Figure 3E:
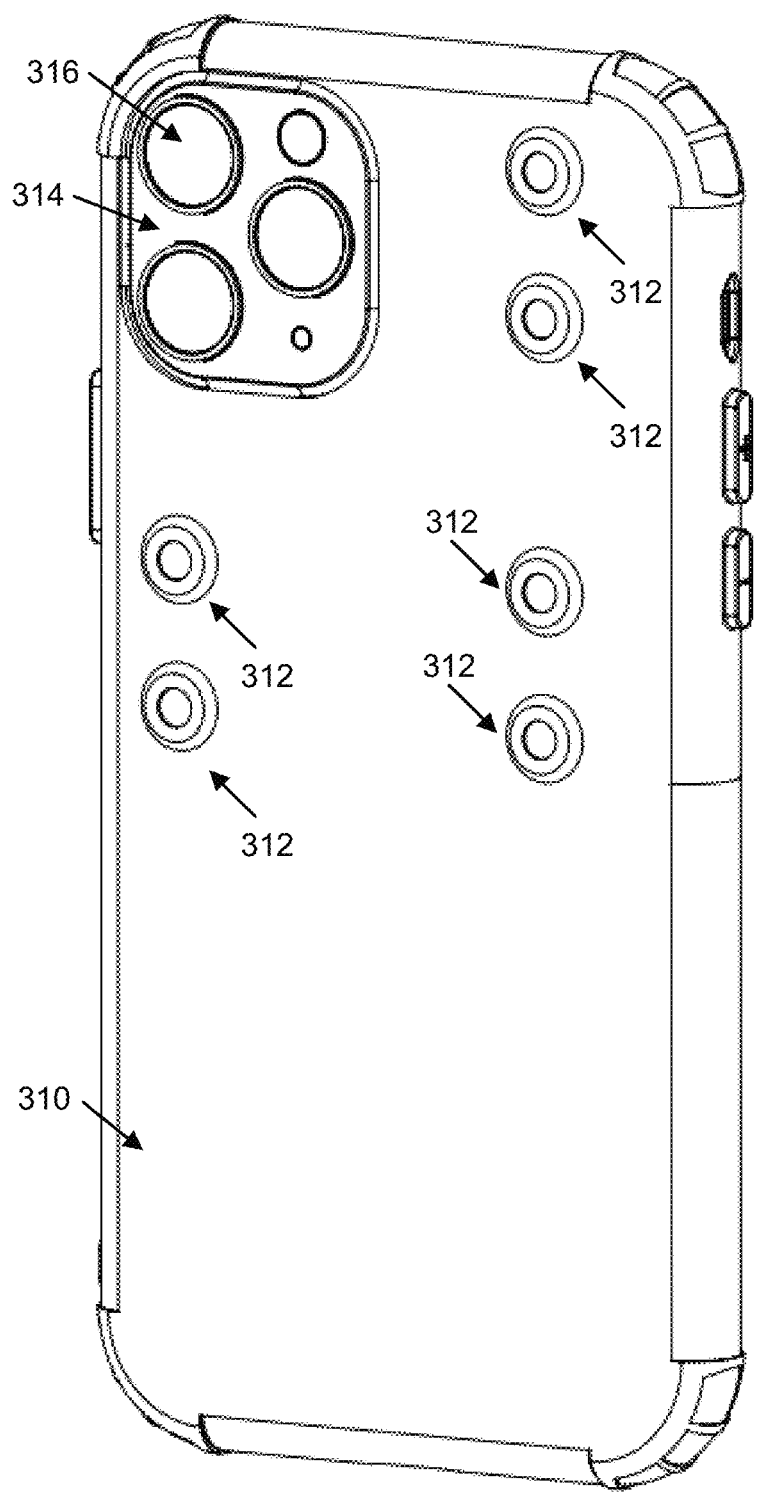
FIG. 3E depicts a back view of another embodiment of a device case.

FIG. 3E depicts one embodiment of a device 314, e.g., a phone, with the device 310 cover attached to the device 314. The device 314 may include multiple different cameras 316 in multiple different arrangements or configurations.

Figure 3F:
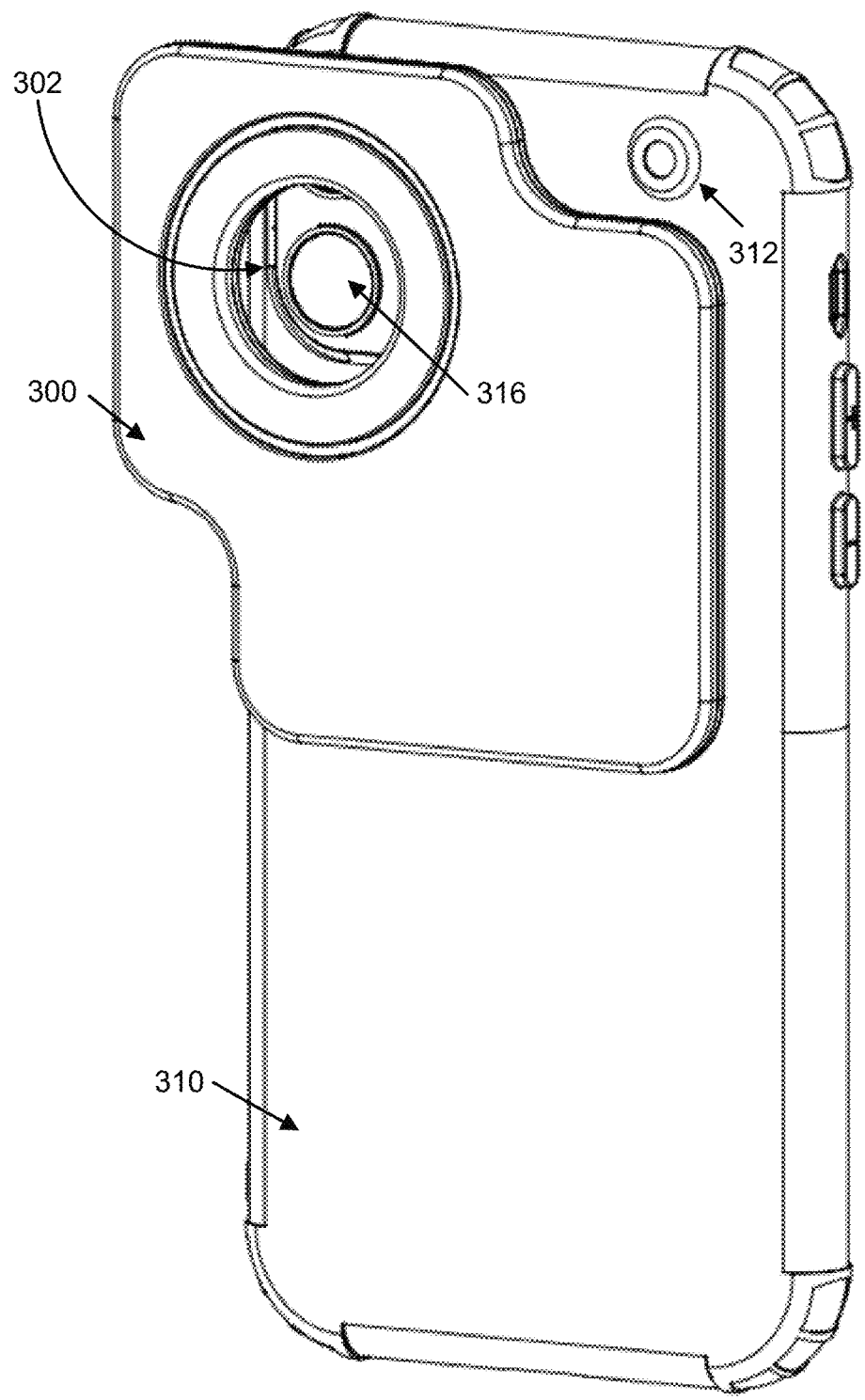
FIG. 3F depicts a back view of one embodiment of a tab connected to a device case.

FIG. 3F depicts one embodiment of a tab 300 connected to the device cover 310 in a first position using a snap fit between the snaps 308 on the second side 305 of the tab 300 and the corresponding snap receiving means 312. In such an embodiment, attaching the tab 300 to the device cover 310 in the first position allows alignment between a camera 316 and the opening or aperture 302 in the tab 300.

Figure 3G:
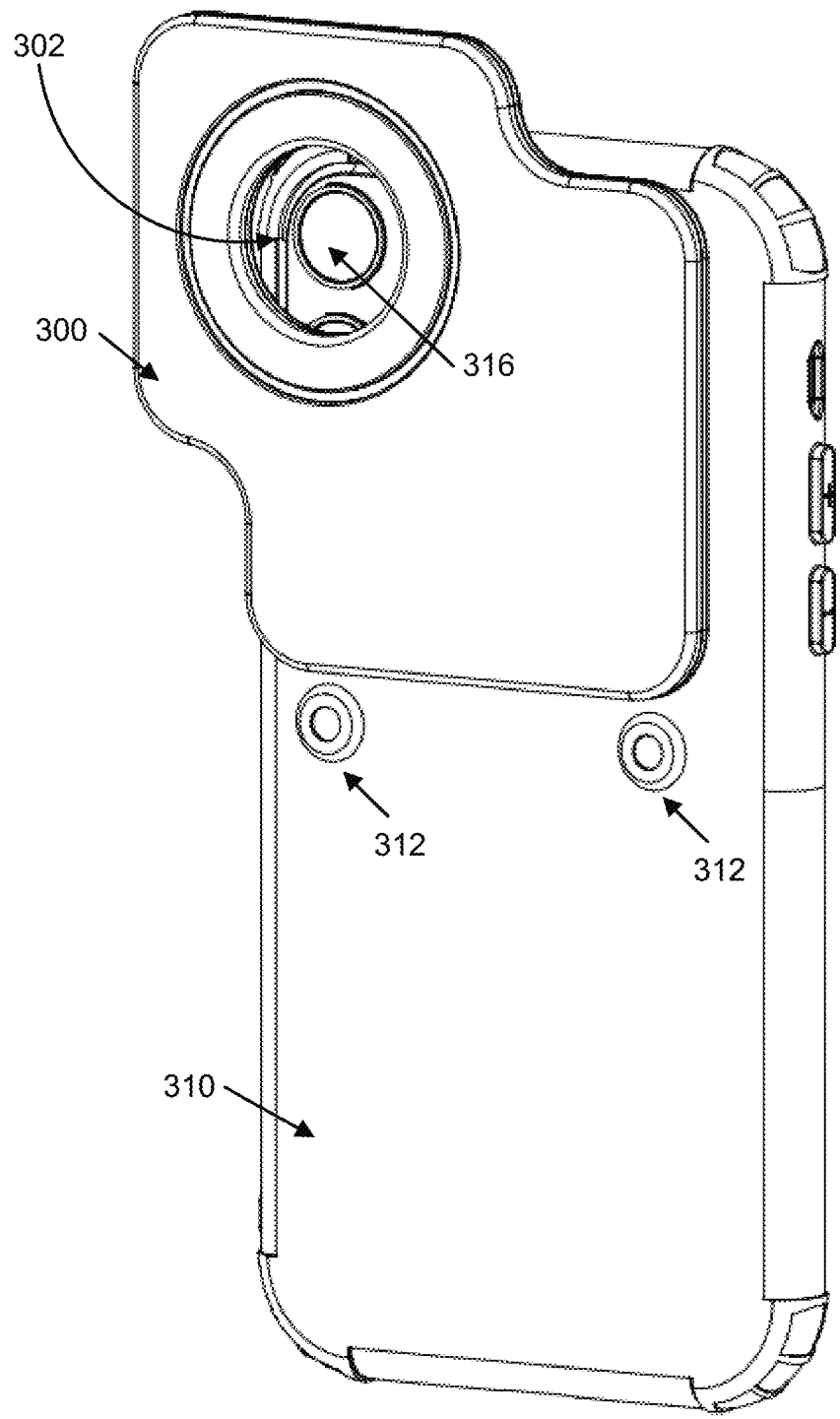
FIG. 3G depicts a back view of one embodiment of a tab connected to a device case.

FIG. 3G depicts one embodiment of a tab 300 connected to the device cover 310 in a second position using a snap fit between the snaps 308 on the second side 305 of the tab 300 and the corresponding snap receiving means 312. In such an embodiment, attaching the tab 300 to the device cover 310 in the second position allows alignment between a different camera 316 than the camera depicted in FIG. 3F and the opening or aperture 302 in the tab 300.

Figure 4A:
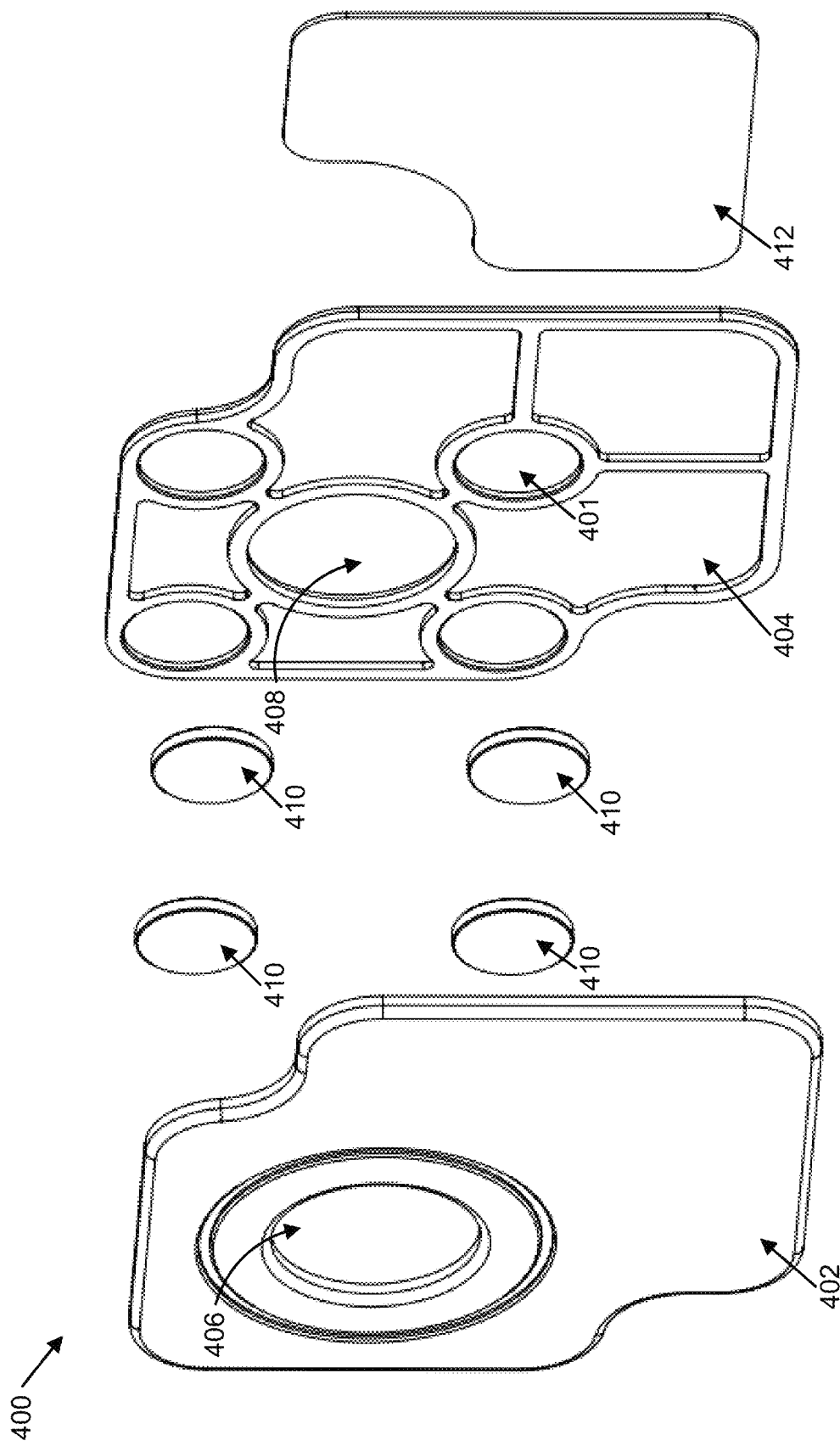
FIG. 4A depicts an exploded front view of one embodiment of a tab.
Figure 4B:
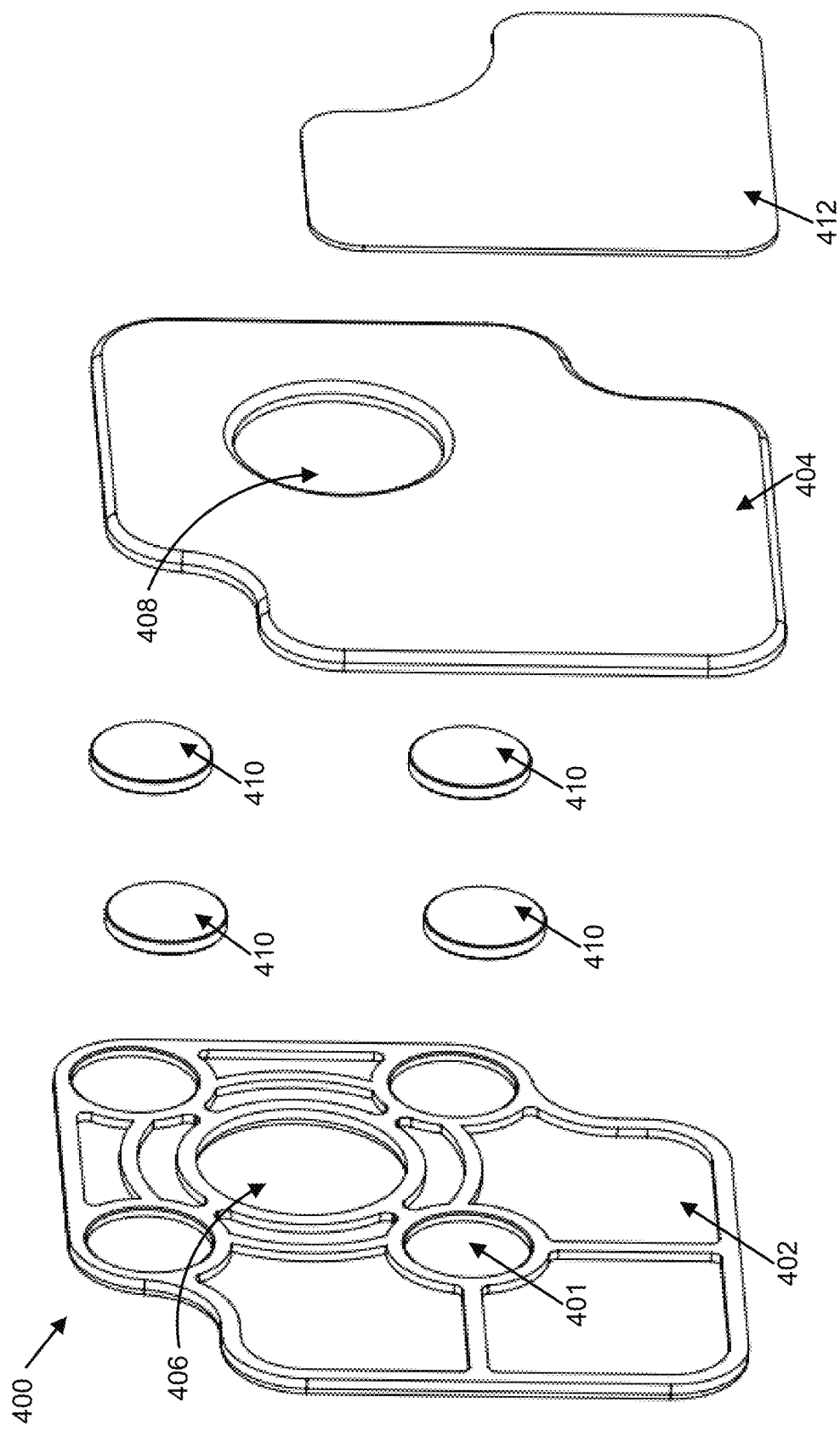
FIG. 4B depicts an exploded back view of one embodiment of a tab.

FIGS. 4A and 4B depict exploded front and back views, respectively, further illustrating one embodiment of a tab 400, which may be substantially similar to the tab 300 described above with reference to FIGS. 3A and 3B. The tab 400, in one embodiment, includes a first side 402 and a second side 404.

In certain embodiments, the first side 402 and the second side 404 are substantially parallel to one another, as depicted in FIGS. 4A and 4B. When in use, the first side 402 is typically oriented towards or facing the adapter (described below with reference to FIGS. 5A and 5B) while the second side 404 is typically oriented towards the camera lens.

In certain embodiments, the first side 402 contains an opening or aperture 406 that, when the first side 402 is connected to the second side 404, substantially aligns with a corresponding opening or aperture 408 in the second side 404 to create a completely contained, bore type aperture or opening through the tab 400.

In certain embodiments, magnets 410 are embedded between the first side 402 and the second side 404 of the tab 400. In one embodiment, four magnets 410 are embedded between the first side 402 and the second side 404. In other embodiments, as few as two magnets may be used, or as many as fifty magnets may be likewise embedded. In one embodiment, a single ring-shaped magnet may be placed between the first side 402 and the second side 404 that includes an aperture or opening that corresponds to the apertures 406, 408 of the tab 400. One of skill in the art will recognize, in light of this disclosure, that various numbers of magnets may be used.

In one embodiment, the first 402 and second 404 sides are manufactured, e.g., thermoformed, to include formations 401 such as grooves, recesses, cavities, hollows, cut-outs, pockets, beds, and/or the like that correspond to a size and shape of the magnets 410 being used such that the magnets 410 are securely positioned or located between the first 402 and second 404 sides.

In certain embodiments, the adhesive 412 covers at least a portion of the second side 404 while typically leaving the opening or aperture 408—and consequentially opening or aperture 406—uncovered. The adhesive 412 is used to couple the second side 404 to a surface area connected to a camera lens, e.g., a surface of a body of a smart phone/tablet device, or the surface area of an attachment that couples to the surface area connected to a camera lens, e.g., a phone/tablet cover.

In other embodiments, the adhesive 412 may be substituted for a different method of coupling. This may include a friction fit, a snap fit, a screw on, a magnetic force, hook and loop fasteners, or any other means of sturdy attachment, e.g., as shown in FIGS. 3C-3G.

Figure 5A:
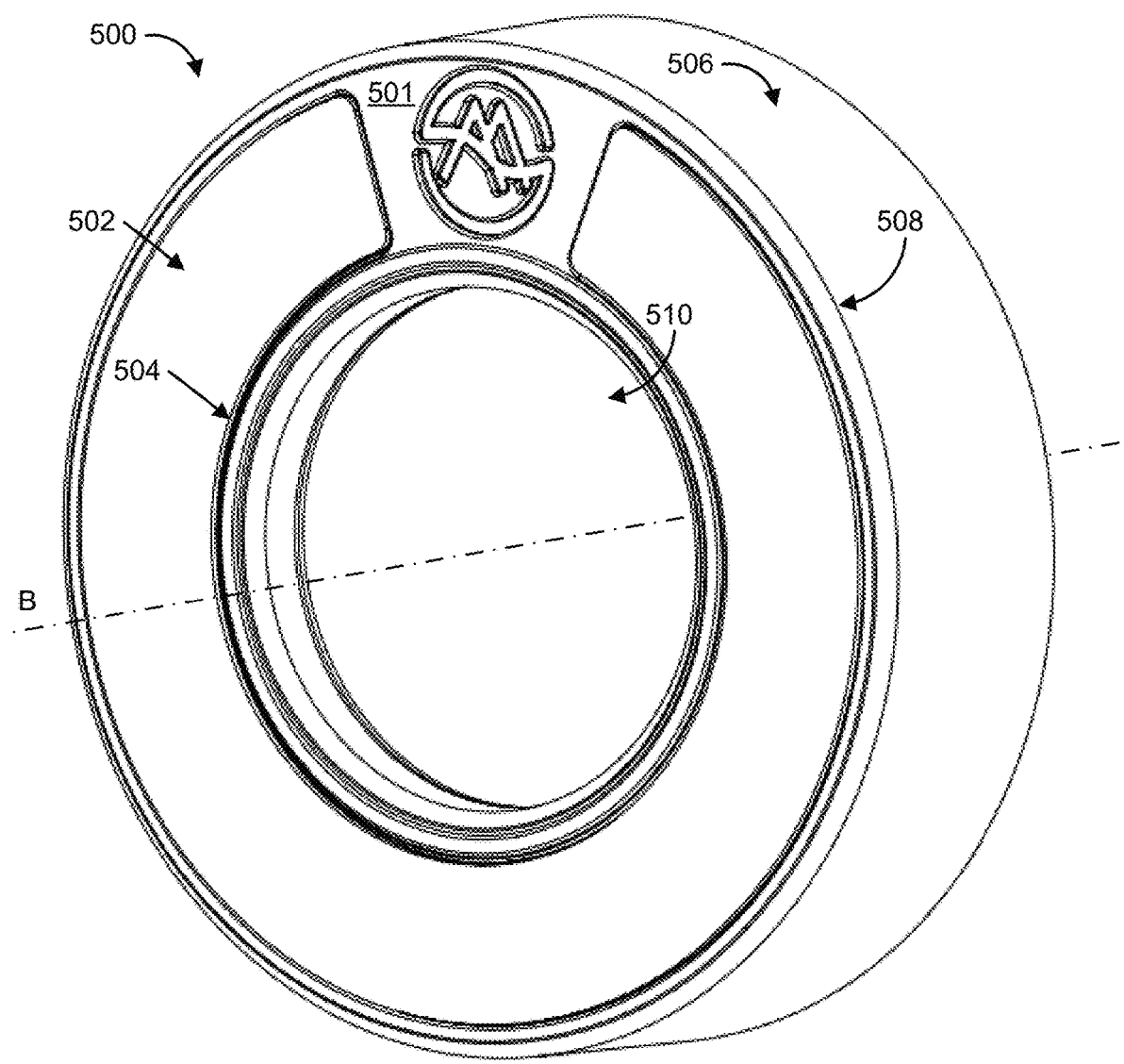
FIG. 5A depicts a front view of one embodiment of an adapter.
Figure 5B:
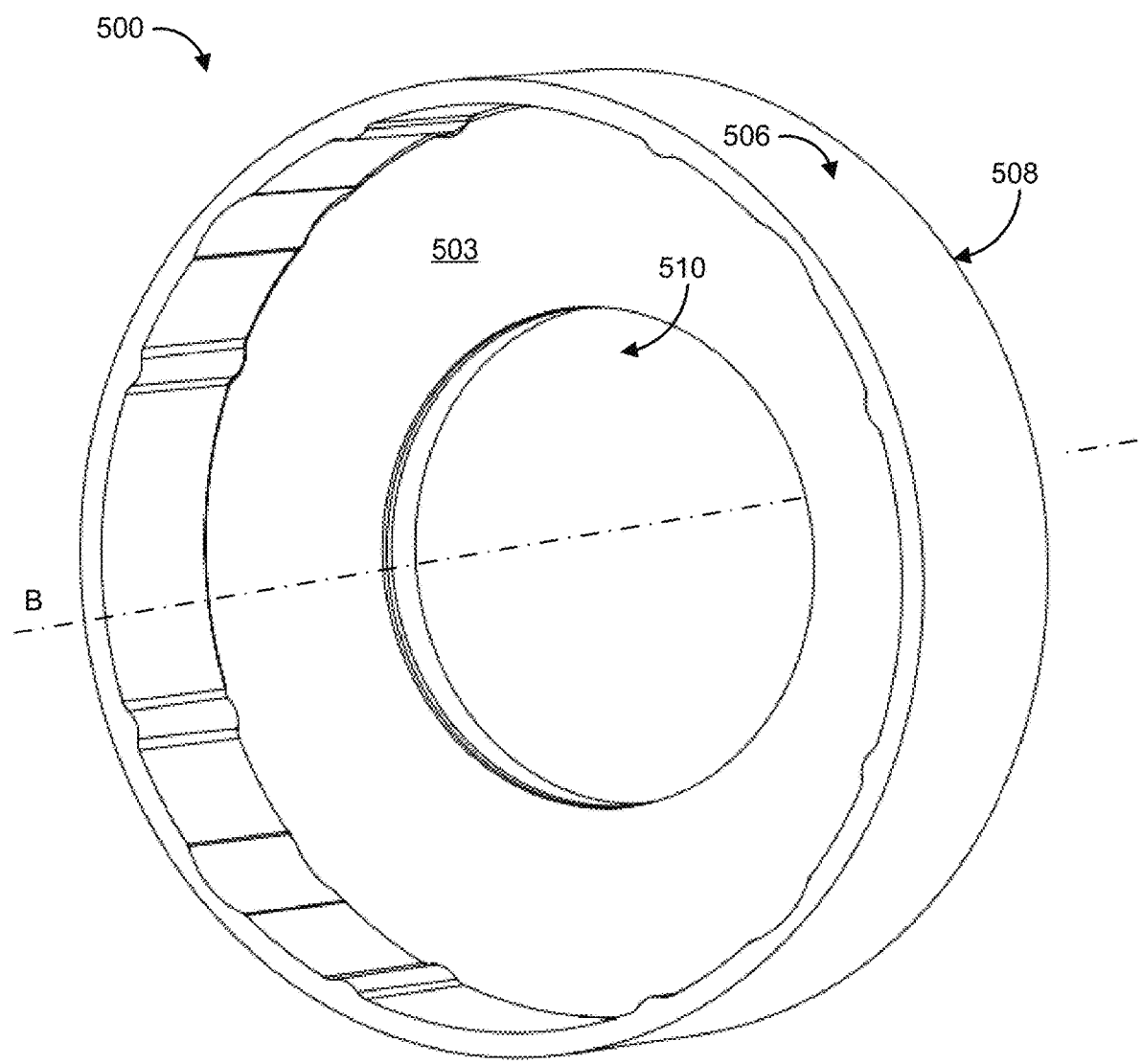
FIG. 5B depicts a back view of one embodiment of an adapter.

FIGS. 5A and 5B are an assembled front and back view, respectively, illustrating one embodiment of an adapter 500. As used herein, an adapter 500 may refer to a device of the present disclosure that attaches a tab, e.g., the tabs described above, to an optical instrument, e.g., a spotting scope, a rifle scope, a microscope, and/or the like. The adapter 500, in one embodiment, includes an adapter body, comprising a first side 501 and a second side 503, a non-slip rubber surface 502, a raised concentric guide ring 504, and a lip or sidewall 506 protruding along an axis B perpendicular to an edge 508 of the adapter 500.

In one embodiment, the adapter 500 forms a substantially circular shape. In such an embodiment, the opening or aperture 510 is centrally located in the adapter 500. In one embodiment, the second side 503 of the adapter 500, when installed, faces or is positioned toward the optical lens while the first side 501 faces towards the tab, as described above. In such an embodiment, the raised concentric guide ring 504 is configured to fit into, match, or correspond to the engraved concentric guide ring 104 of the tab 100 to help secure the tab 100 to the adapter 500. One of skill in the art, in light of this disclosure will recognize that the adapter 500 can take many different shapes to correspond to the optical instrument that the adapter 500 is installed on.

In some embodiments, the lip or sidewall 506 protrudes toward the optical instrument to both couple the adapter 500 to the eyepiece of the optical instrument as a friction fit and to prevent light from entering the eyepiece, e.g., the part of the optical instrument one looks in to. In other embodiments, the friction fit purpose of the lip or sidewall 506 may be substituted for a different method of coupling such as a snap fit, a screw on fit, a magnetic force, an adhesive, hook and loop fasteners, or any other means of sturdy attachment.

Figure 5C:
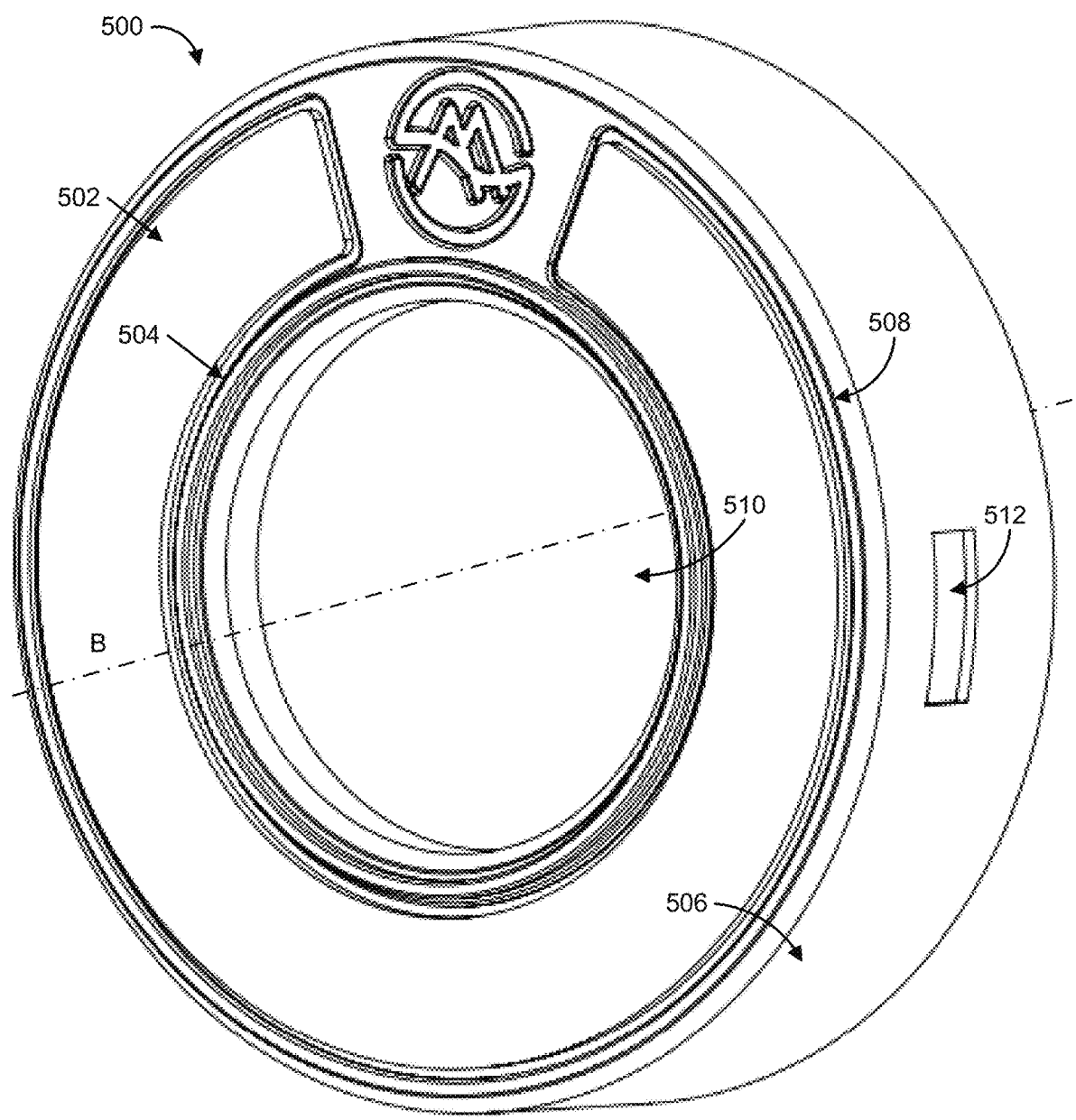
FIG. 5C depicts a front view of one embodiment of an adapter that includes slots for a universal adapter insert.
Figure 5D:
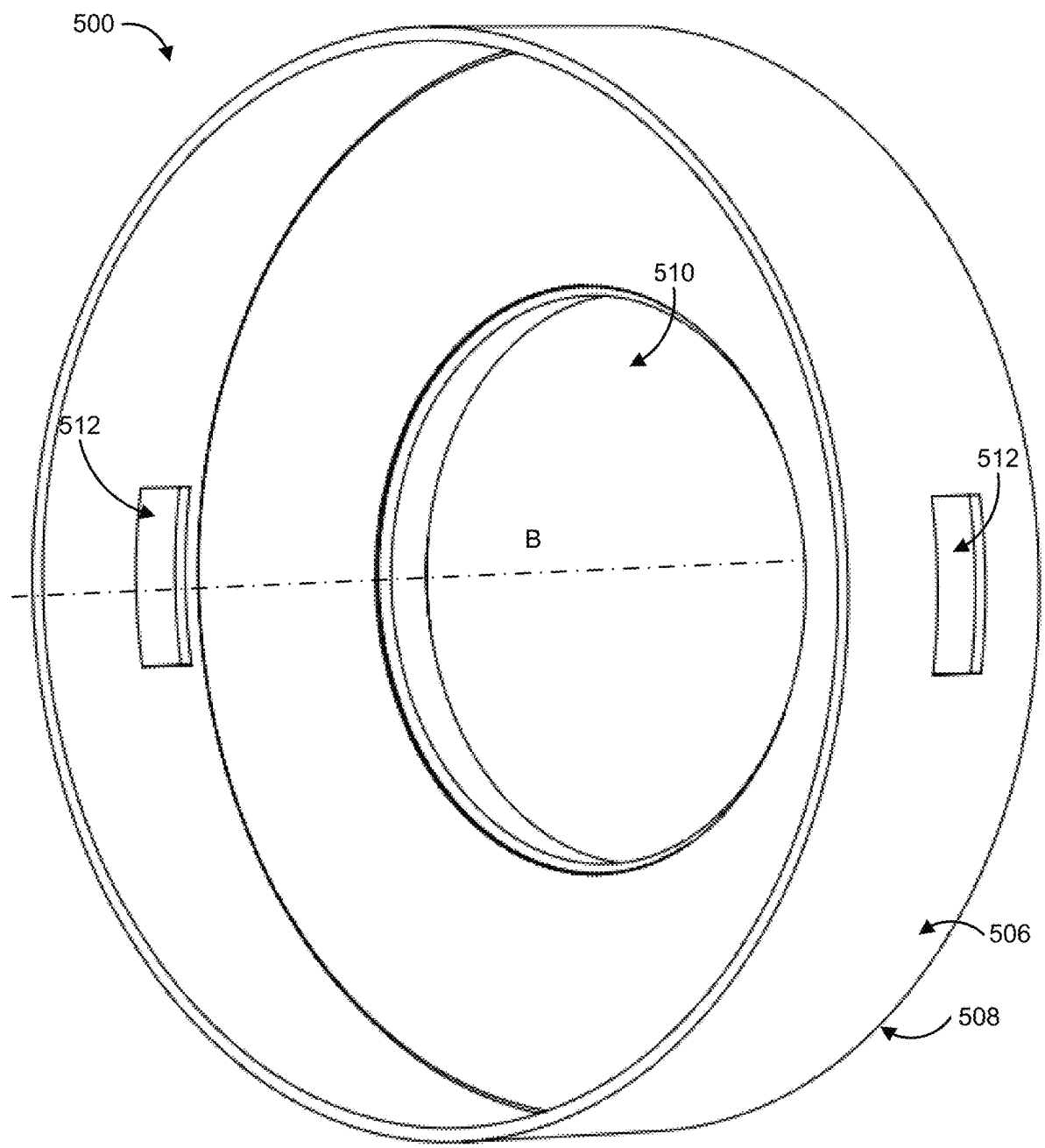
FIG. 5D depicts a back view of one embodiment of an adapter that includes slots for a universal adapter insert.

FIGS. 5C-5G depict one embodiment of an adapter 500 configured for receiving a universal adapter insert. As used herein, the universal adapter insert may be a component that fits securely into the adapter 500, using tabs or other protrusions that click-into or otherwise securely fit into openings 512 or slots on the lip or sidewall 506 of a side of the adapter 500, as shown in FIGS. 5C-5D, and that can be various sizes to accommodate various-sized eyepieces of optical lenses.

Figure 5E:
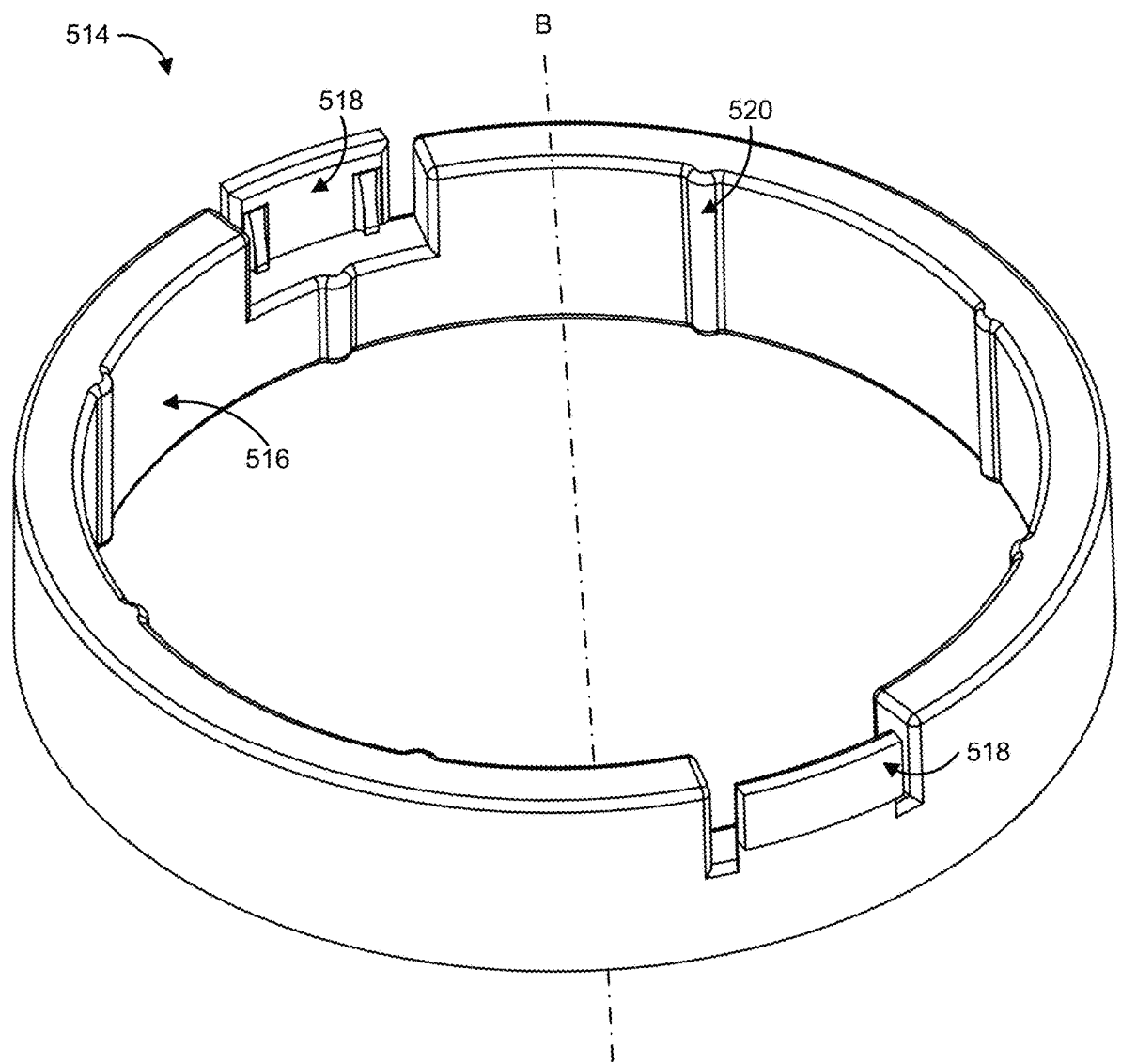
FIG. 5E depicts one embodiment of a universal adapter insert.

FIG. 5E depicts one embodiment of a universal adapter insert 514. The universal adapter insert 514 may be a substantially round ring 516 that includes tabs 518 or other protrusions that are configured to snap into, click into, or otherwise securely fit into slots 512 located along the lip or sidewall of the adapter 500. The universal adapter insert 514 may also include knubs 520, tabs, ridges, or other protruding members for increasing the surface contact of the universal adapter insert 514 on an optics eyepiece, which increases the holding force of the adapter 500 when placed on an optics eyepiece. In various embodiments, the universal adapter insert 514 may be comprised of plastic, rubber, metal, and/or the like, and may secure to the adapter 500 using other attachment means including a screw fit, a friction fit, compression fit, a magnetic fit, and/or the like.

Figure 5F:
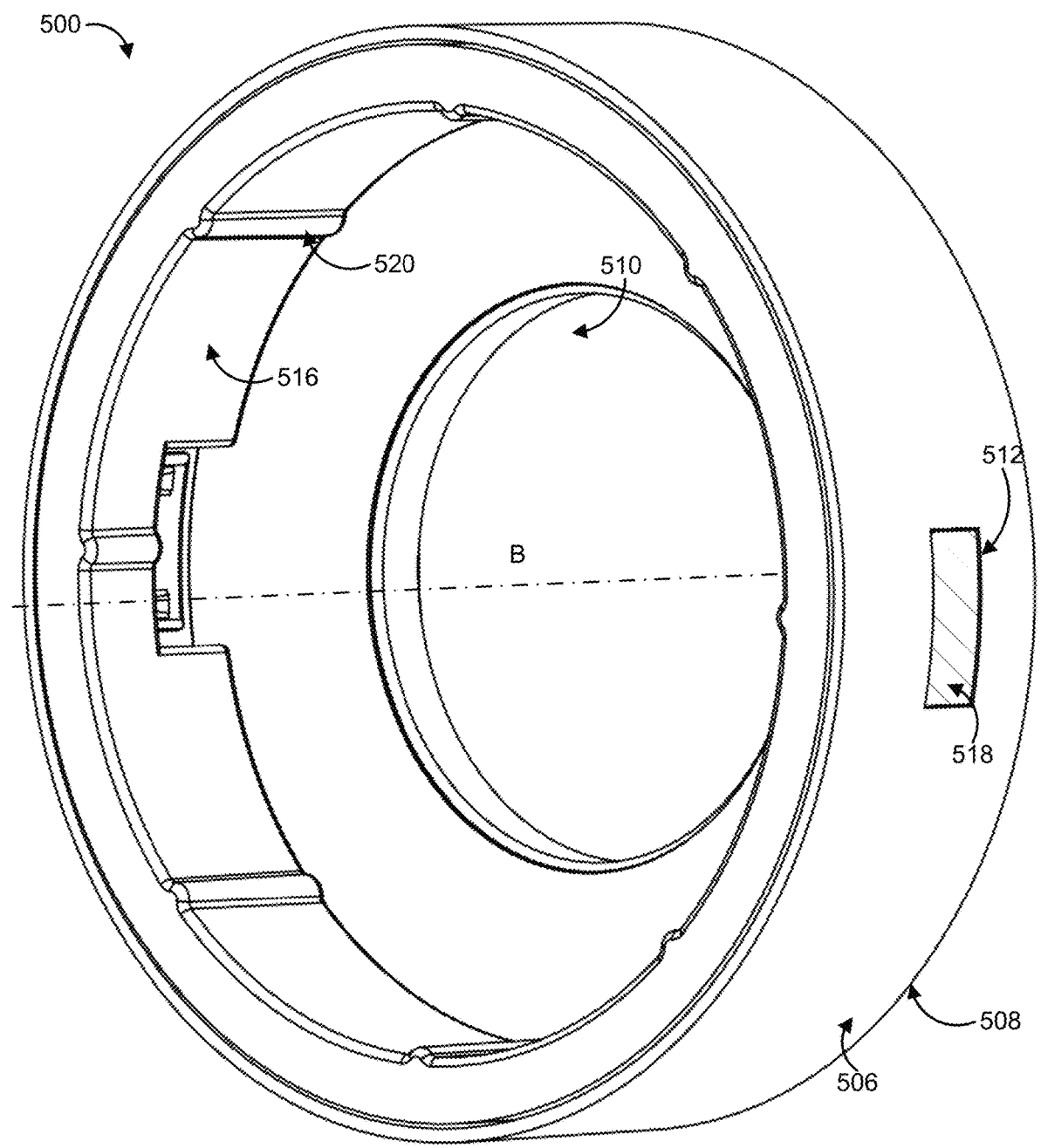
FIG. 5F depicts a back view of one embodiment of an adapter with a universal adapter insert.
Figure 5G:
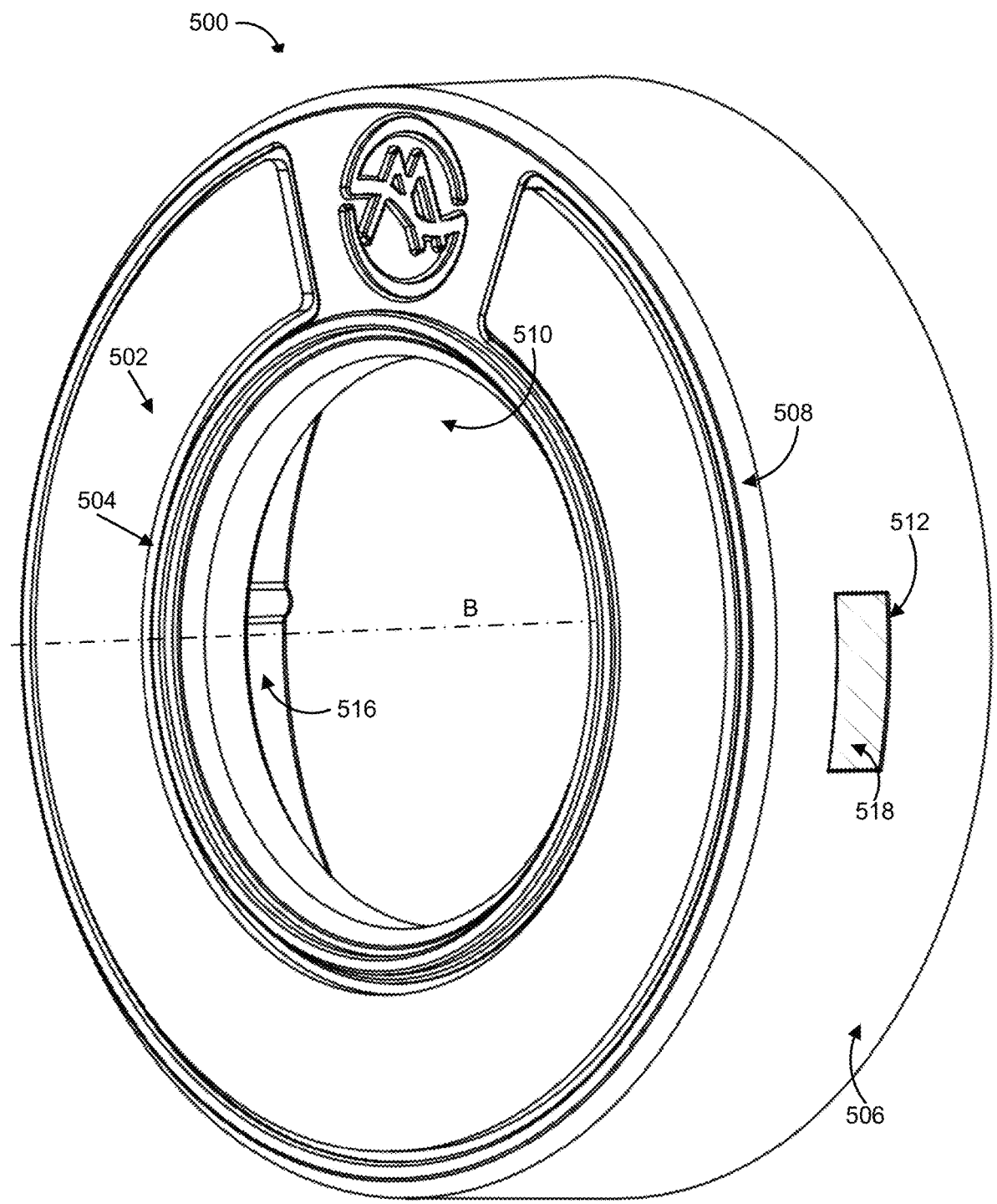
FIG. 5G depicts a front view of one embodiment of an adapter with a universal adapter insert.

FIGS. 5F and 5G depict one example embodiment of an adapter 500 with a universal adapter insert 514 inserted into the adapter 500. The universal adapter insert 514 tabs 518 are securely locked into, clicked into, or otherwise inserted into the slots 512, openings, or grooves in the lip 506 of the adapter 500. To remove the universal adapter insert 514, in one embodiment, the user simply pushes or otherwise causes the tabs 518 to release from the openings 512. In this manner, the overall inside diameter of the adapter 500 can be adjusted, e.g., made smaller, using a universal adapter insert 514.

Figure 6A:
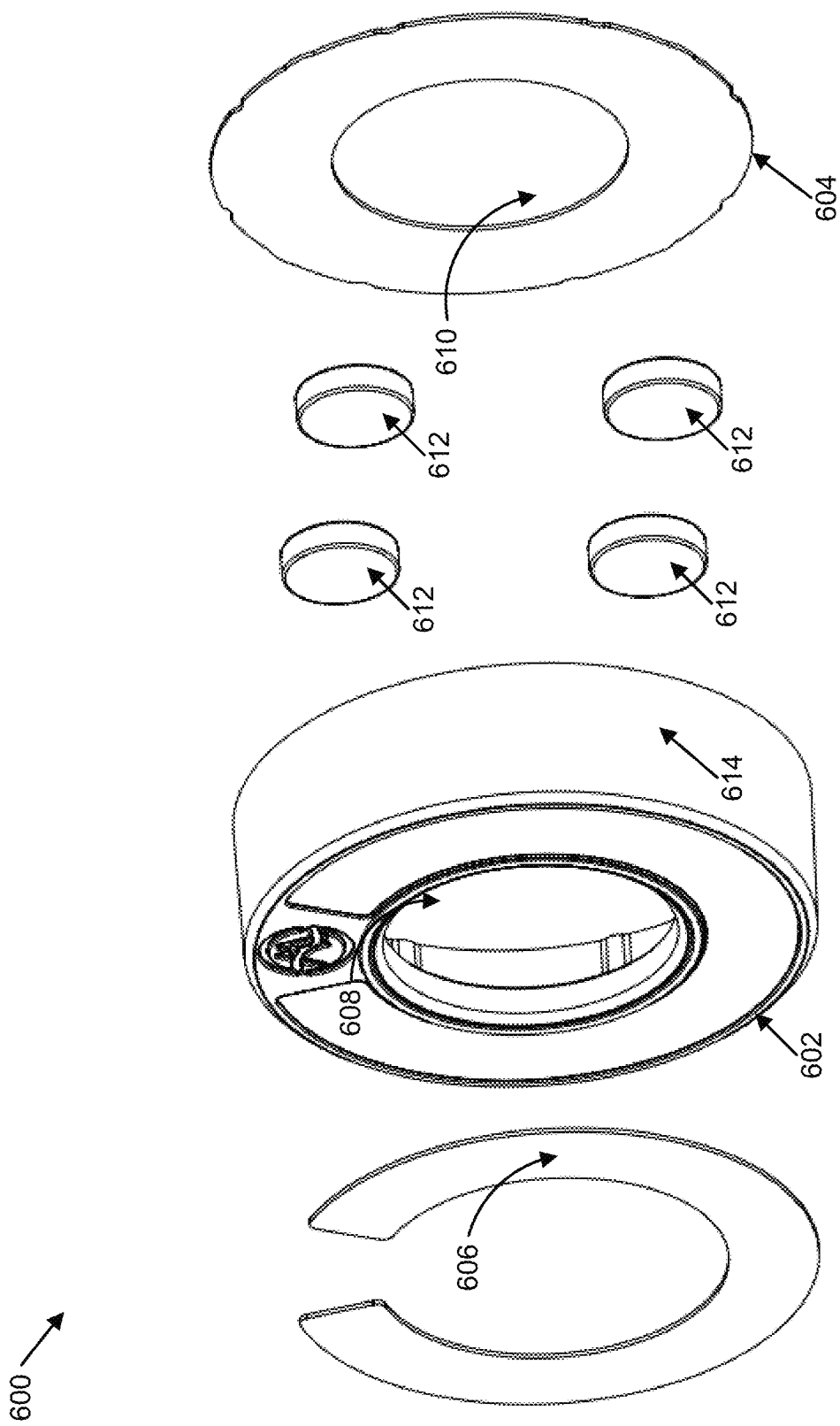
FIG. 6A depicts an exploded front view of one embodiment of an adapter.
Figure 6B:
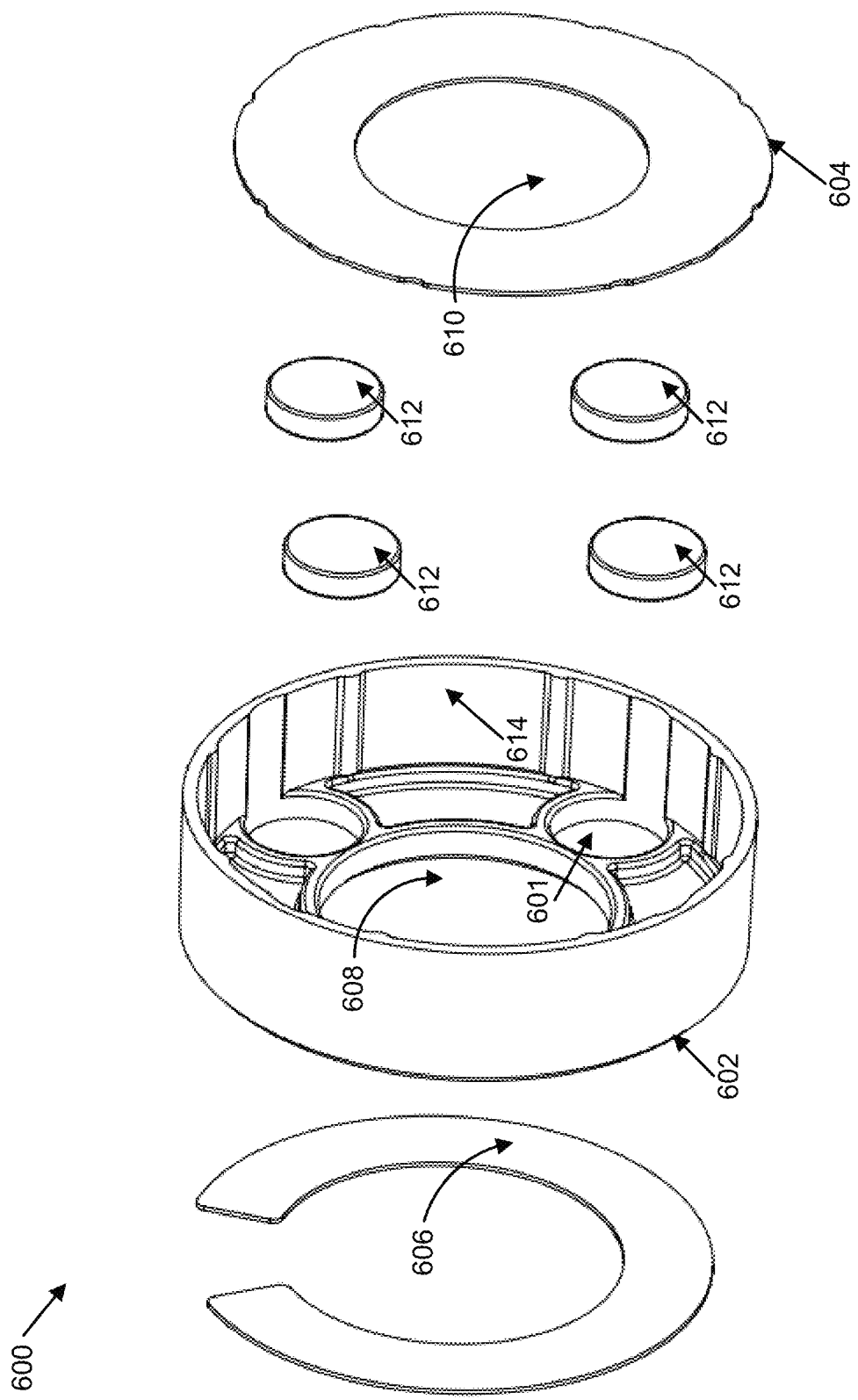
FIG. 6B depicts an exploded back view of one embodiment of an adapter.

FIGS. 6A and 6B are exploded front and back views, respectively, further illustrating one embodiment of an adapter 600, which may be substantially similar to the adapter 500 described above with reference to FIGS. 5A-5G. The adapter 600, in one embodiment, includes a body piece 602, a backing piece 604, and a non-slip rubber surface piece 606.

In certain embodiments, the body piece 602 and backing piece 604 are substantially parallel to one another, as illustrated in FIGS. 6A and 6B. When in use, the body piece 602 is typically oriented towards the tab while the backing piece 604 is typically oriented towards to the optical instrument.

In certain embodiments, the body piece 602 contains an opening or aperture 608 that, when the body piece 602 is connected to the backing piece 604, substantially aligns with a corresponding opening or aperture 610 in the backing piece 604 to create an opening or aperture completely through the adapter 600.

In certain embodiments, magnets 612 are embedded between the body piece 602 and the backing piece 604 of the adapter 600. In one embodiment, four magnets 612 are embedded between the body piece 602 and the backing piece 604. In other embodiments, as few as two magnets 612 may be used, or as many as fifty magnets 612 may be likewise embedded. In one embodiment, a single ring-shaped magnet may be placed between the body piece 602 and the backing piece 604 that includes an aperture or opening that corresponds to the apertures 608, 610 of the adapter 600. One of skill in the art will recognize, in light of this disclosure, that various numbers of magnets 612 may be used.

In one embodiment, the body piece 602 of the adapter 600 is manufactured, e.g., thermoformed, to include formations 601 such as grooves, recesses, cavities, hollows, cut-outs, pockets, beds, and/or the like that correspond to a size and shape of the magnets 612 being used such that the magnets 612 are securely positioned or located between the body piece 602 and the backing piece 604.

In certain embodiments, a lip or sidewall 614 protrudes perpendicular to the outside edge of the body piece 602 toward the optical instrument. The lip or sidewall 614 typically extends past the backing piece 604. The lip or sidewall 614 typically serves to both couple the adapter to the optical instrument as a friction fit and keep errant light from the eyepiece. In other embodiments, the friction fit purpose of the lip or sidewall 614 may be substituted for a different method of coupling. This may include a snap fit, a screw on fit, a magnetic force, an adhesive, hook and loop fasteners, or any other means of sturdy attachment.

In some embodiments, a non-slip rubber surface piece 606 is placed on the body piece 602 to help stabilize connections to both the tab 100 and the cap (described below). In these embodiments, the non-slip rubber surface provides extra traction which significantly mitigates and/or eliminates impact vibrations and/or slight movements that may impact the connection between the adapter 600 and the tab 100 as well as the connection between the adapter 600 and the cap.

Figure 7A:
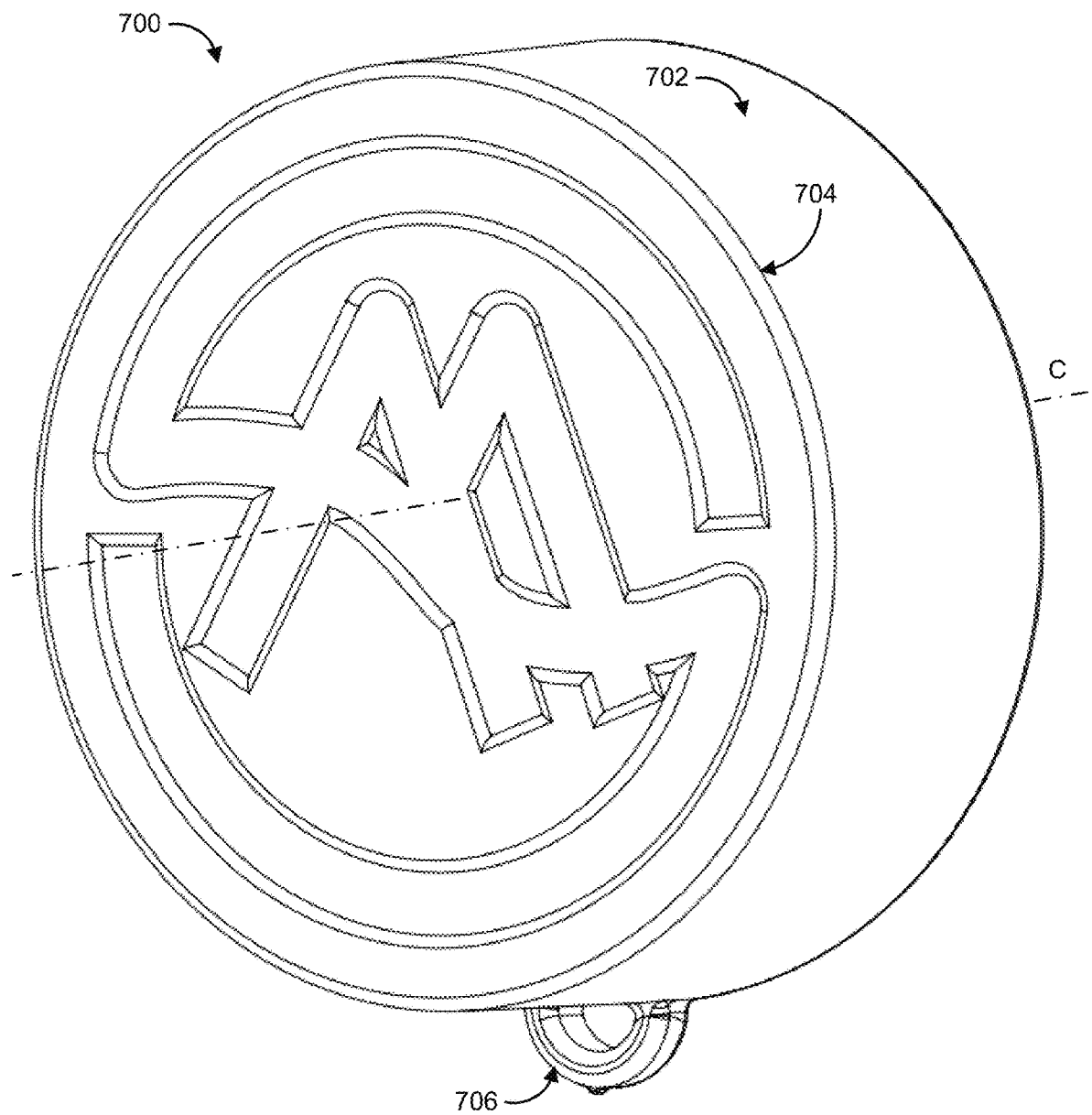
FIG. 7A depicts a front view of one embodiment of a cap for an adapter.
Figure 7B:
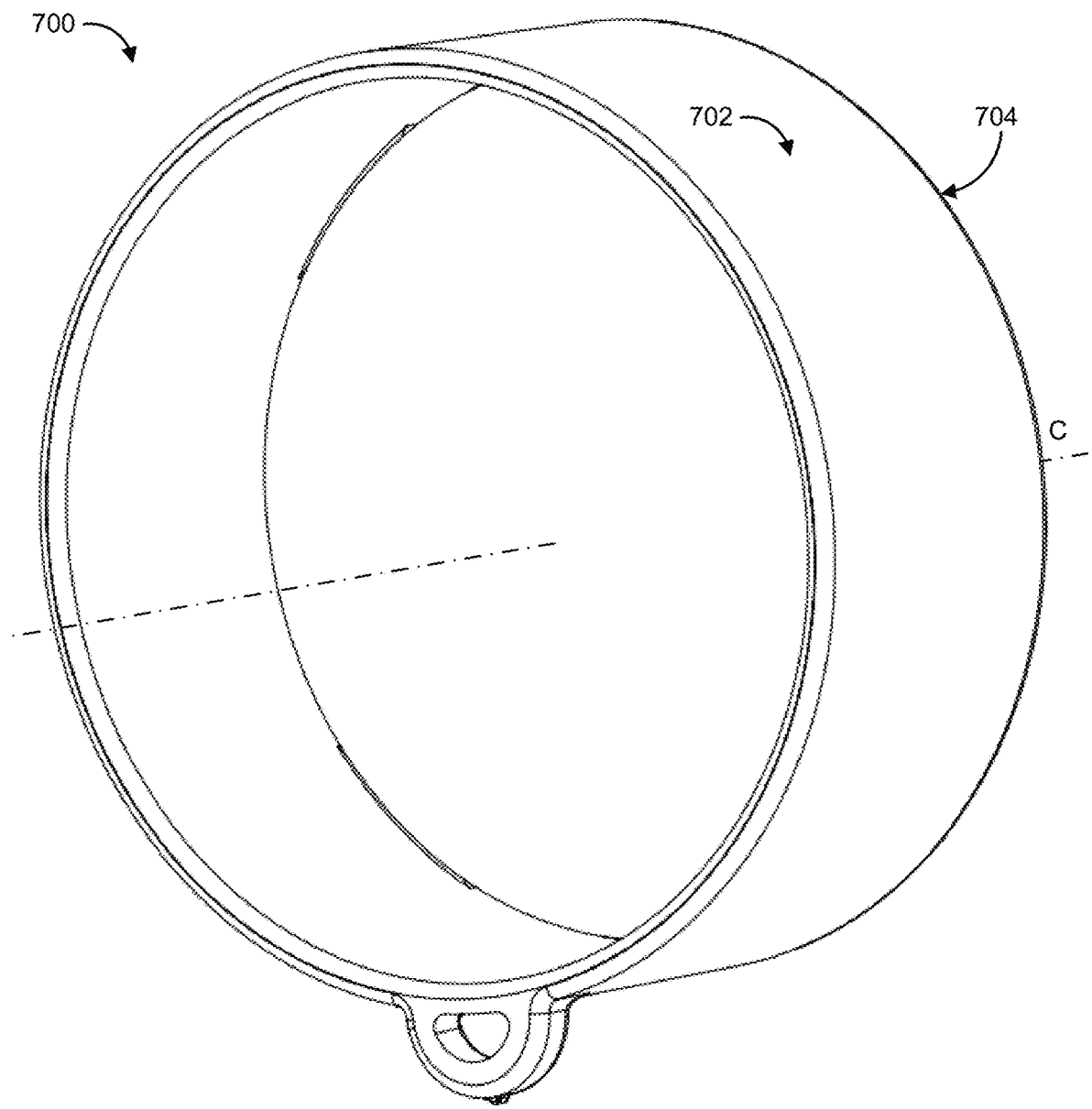
FIG. 7B depicts a back view of one embodiment of a cap for an adapter.

FIGS. 7A and 7B depict an assembled front view and back view, respectively, illustrating one embodiment of a cap 700. The cap 700, in one embodiment, includes a cap body comprising a surface that is configured to cover the first side of the adapter 500, a lip or sidewall 702 protruding along an axis C perpendicular to an edge 704 of the cap 700.

In certain embodiments, when the cap 700 is coupled to an adapter 500, the lip or sidewall 702 protrudes in the direction of the adapter 500 and extends far enough to encompass and conceal the adapter 500. In these embodiments, the lip or sidewall 702 forms a protective case around the adapter 500. For example, if an adapter 500 is one inch in length, then the lip or sidewall 702 would be no less than one inch in length.

In one example embodiment, an adapter 500 may be placed on an end of the optical instrument opposite the eyepiece such that a corresponding cap 700 can be used to protect a lens at the opposite end of the optical instrument. In such an embodiment, the cap 700 may be magnetically attached and removed from the adapter to expose and hide the lens. In one embodiment, the cap 700 includes a tab 706, loop, hook, or the like for attaching a connector, e.g., a string, elastic, rope, or other connector to the cap 700 and another device such as the optical instrument, the adapter 500, and/or the like to prevent the cap 700 from being misplaced, forgotten, or otherwise lost.

FIGS. 8A and 8B depict an exploded front view and back view, respectively, illustrating one embodiment of a cap 800. The cap 800, in one embodiment, includes a body piece 802 and a backing piece 804.

In certain embodiments, the body piece 802 and the backing piece 804 are substantially parallel to one another, as illustrated in FIGS. 8A and 8B. When in use, the backing piece 804 is typically oriented toward the adapter 500.

In certain embodiments, the magnets 806 are embedded between the body piece 802 and the backing piece 804 of the cap 800. In one embodiment, four magnets 806 are embedded between the body piece 802 and the backing piece 804. In other embodiments, as few as two magnets 806 may be used, or as many as fifty magnets 806 may be likewise embedded. In one embodiment, a single circular, disc, or ring-shaped magnet may be placed between the body piece 802 and the backing piece 804 of the cap 800. One of skill in the art will recognize, in light of this disclosure, that various numbers of magnets 806 may be used.

In one embodiment, the body piece 802 is manufactured, e.g., thermoformed, to include formations 801 such as grooves, recesses, cavities, hollows, cut-outs, pockets, beds, and/or the like that correspond to a size and shape of the magnets 806 being used such that the magnets 806 are securely positioned or located between the body piece 802 and the backing piece 804.

When the cap 800 is coupled to an adapter 500, the lip or sidewall 808 protrudes perpendicular to an outside edge of the body piece 802 toward the backing piece 804. The lip or sidewall 808 typically extends far enough to encompass the adapter 500. In certain embodiments, the body piece 802 and the lip or sidewall 808 form a protective case around the adapter 500.

Figure 9A:
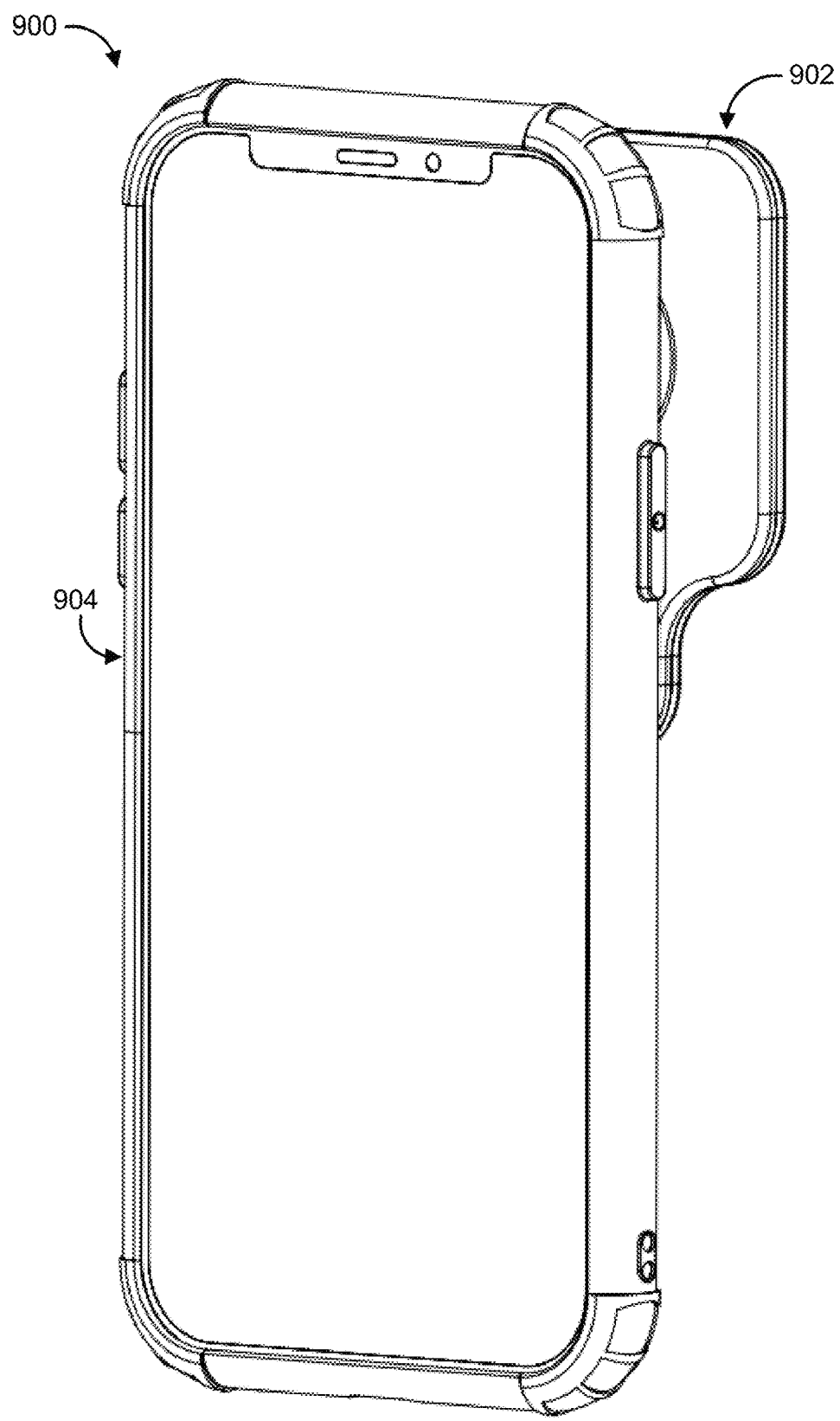
FIG. 9A depicts a front view of one embodiment of a tab connected to a device case.
Figure 9B:
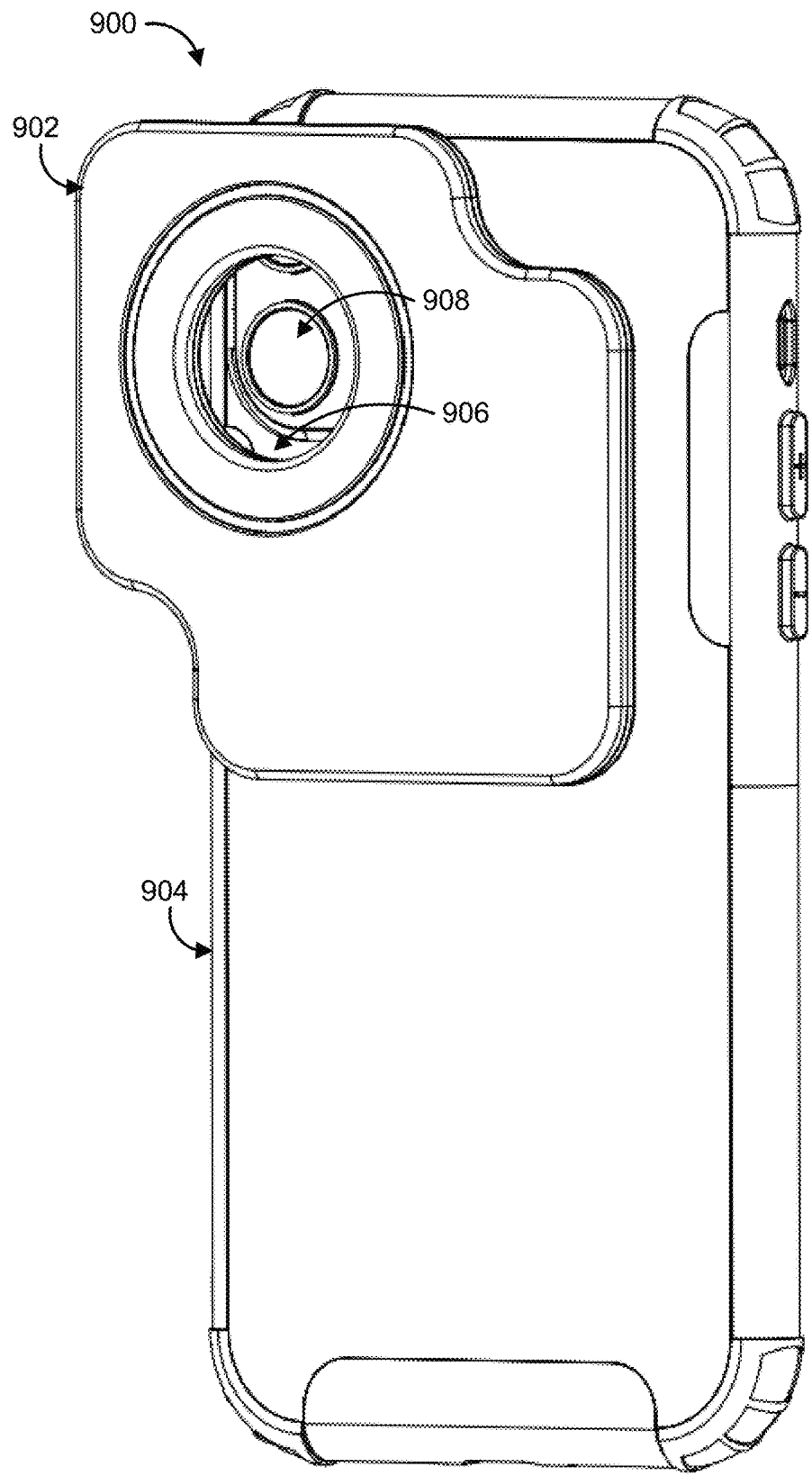
FIG. 9B depicts a back view of one embodiment of a tab connected to a device case.

FIGS. 9A and 9B depict assembled front and back views, respectively, illustrating one embodiment of a combined camera and tab 900. In one embodiment, a tab 902 is coupled to a phone case 904.

In certain embodiments, the tab 902 is coupled to the phone case 904 in an orientation that an opening or aperture 906 leaves the camera lens 908 of the phone uncovered while the tab 902 is attached to the phone case 904.

Figure 10A:
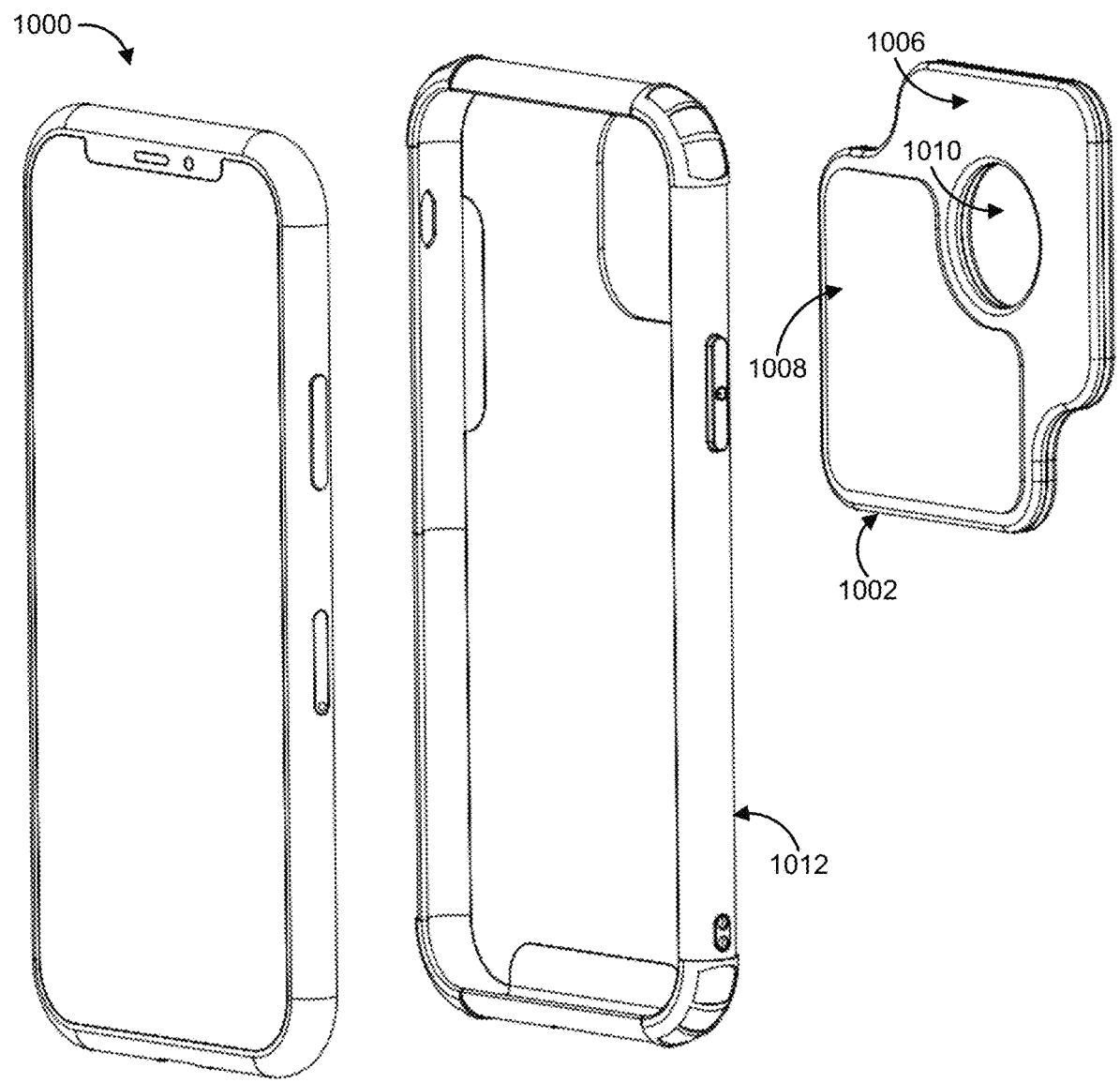
FIG. 10A depicts an exploded front view of one embodiment of an assembly comprising a device, a device case, and a tab.
Figure 10B:
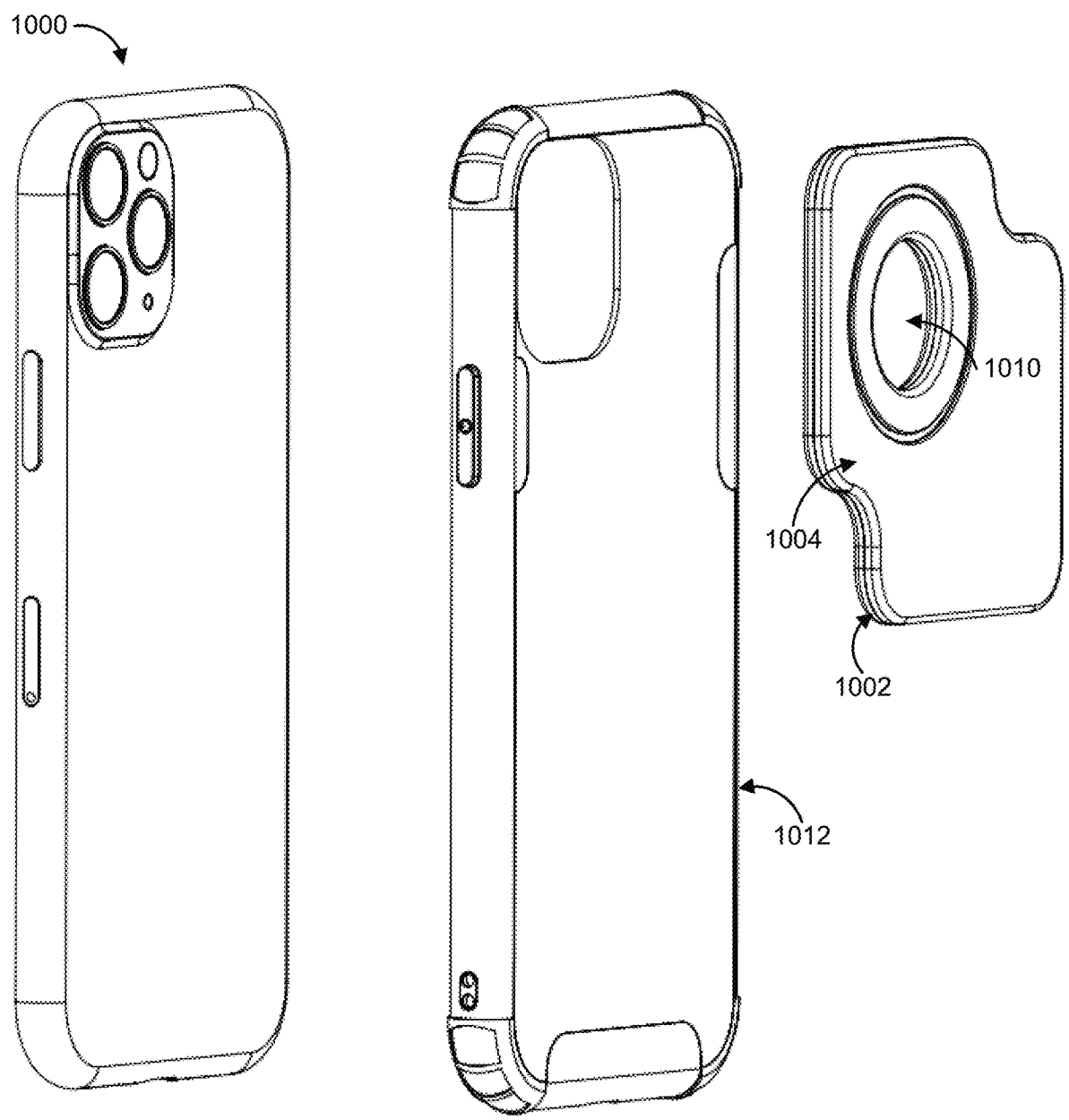
FIG. 10B depicts an exploded back view of one embodiment of an assembly comprising a device, a device case, and a tab.

FIGS. 10A and 10B depict exploded front and back views, respectively, illustrating one embodiment of a combined camera and tab 1000. The tab 1002, in one embodiment, includes a front side 1004 and a back side 1006. When in use, the back side 1006 is typically oriented towards the camera lens while the front side 1004 is typically oriented towards the adapter.

In certain embodiments, the adhesive 1008 covers at least a portion of the back side 1006 while typically leaving the opening or aperture 1010 uncovered. The adhesive 1008 is used to couple the back side 1006 to a surface area of the phone case 1012 that couples to a phone connected to a camera lens.

In other embodiments, the adhesive 1008 may be substituted for a different method of coupling. This may include a friction fit, a snap fit, a screw on fit, a magnetic force, hook and loop fasteners, or any other means of sturdy attachment.

Figure 11:
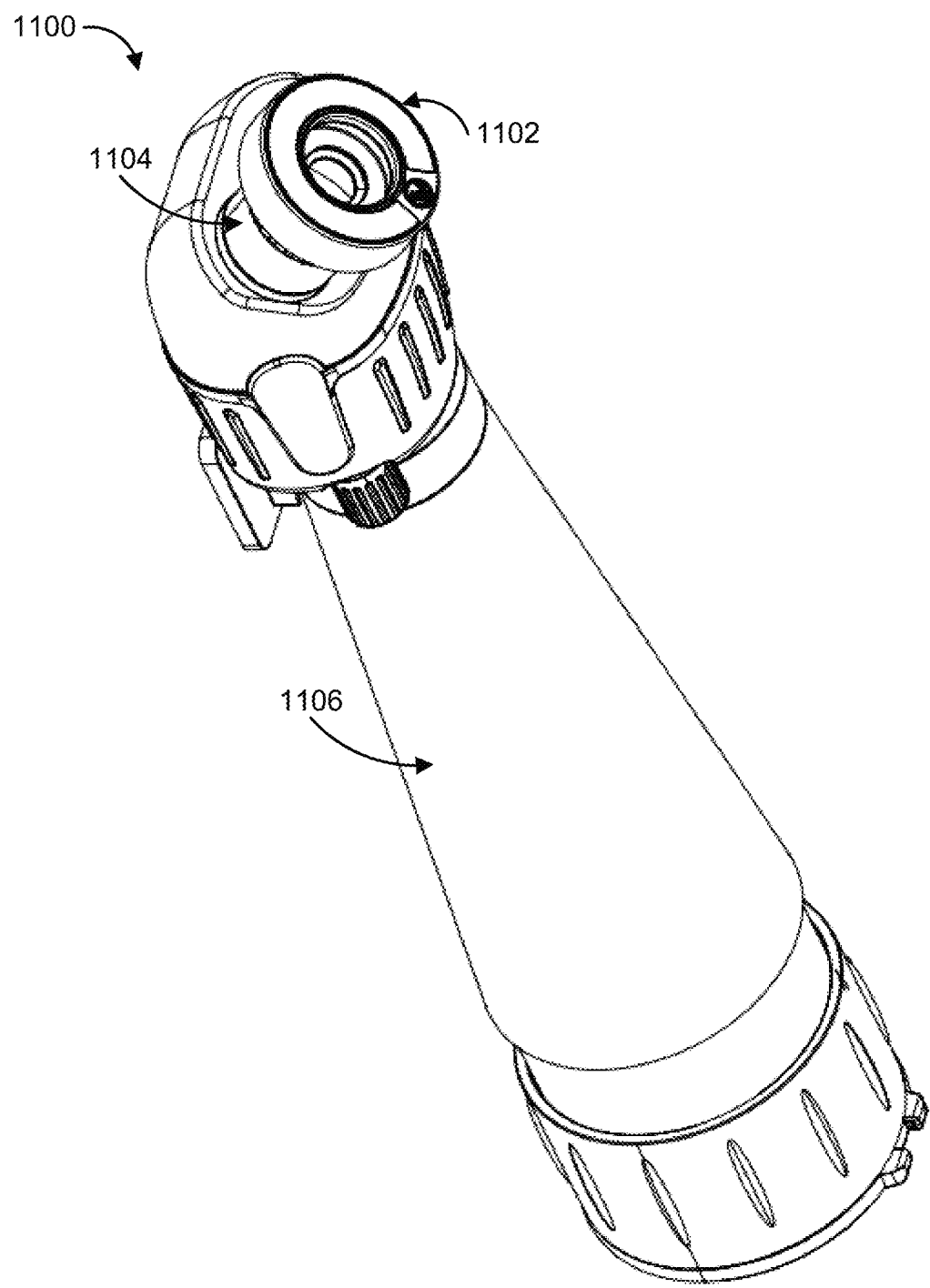
FIG. 11 is an assembled view of one embodiment of an optical instrument and an adapter.

FIG. 11 is an assembled view illustrating one embodiment 1100 of a combined adapter 1102 and optical instrument 1106. In the depicted embodiment, an adapter 1102 is mounted to the eyepiece 1104 of a spotting scope 1106. In certain embodiments, the adapter 1102 is mounted to the eyepiece 1104 using a universal adapter insert, as described above.

Figure 12:
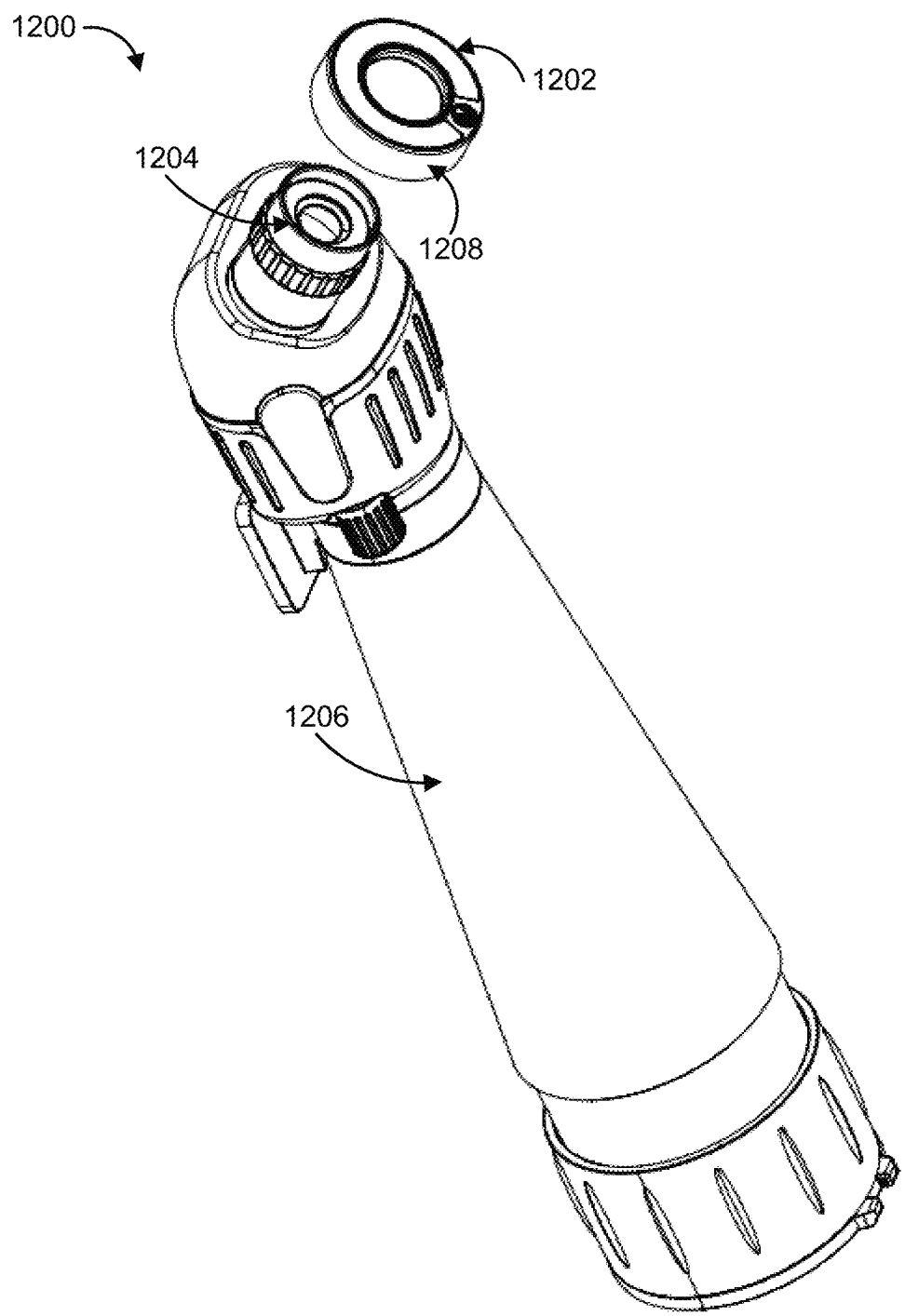
FIG. 12 is an exploded view of one embodiment of an optical instrument and an adapter.

FIG. 12 is an exploded view illustrating one embodiment 1200 of a combined adapter 1202 and optical device 1206. In one embodiment, an adapter 1202 interfaces with the eyepiece 1204 of an optical instrument 1206, possibly using a universal adapter insert, described above. An adapter lip or sidewall 1208, in one embodiment, serves to both couple the adapter 1202 to the optical instrument 1206 as a friction fit and prevent light from entering the eyepiece 1204. In other embodiments, the friction fit purpose of the lip or sidewall 1208 may be substituted for a different method of coupling. This may include a snap fit, a screw on fit, a magnetic force, an adhesive, hook and loop fasteners, or any other means of sturdy attachment.

Figure 13:
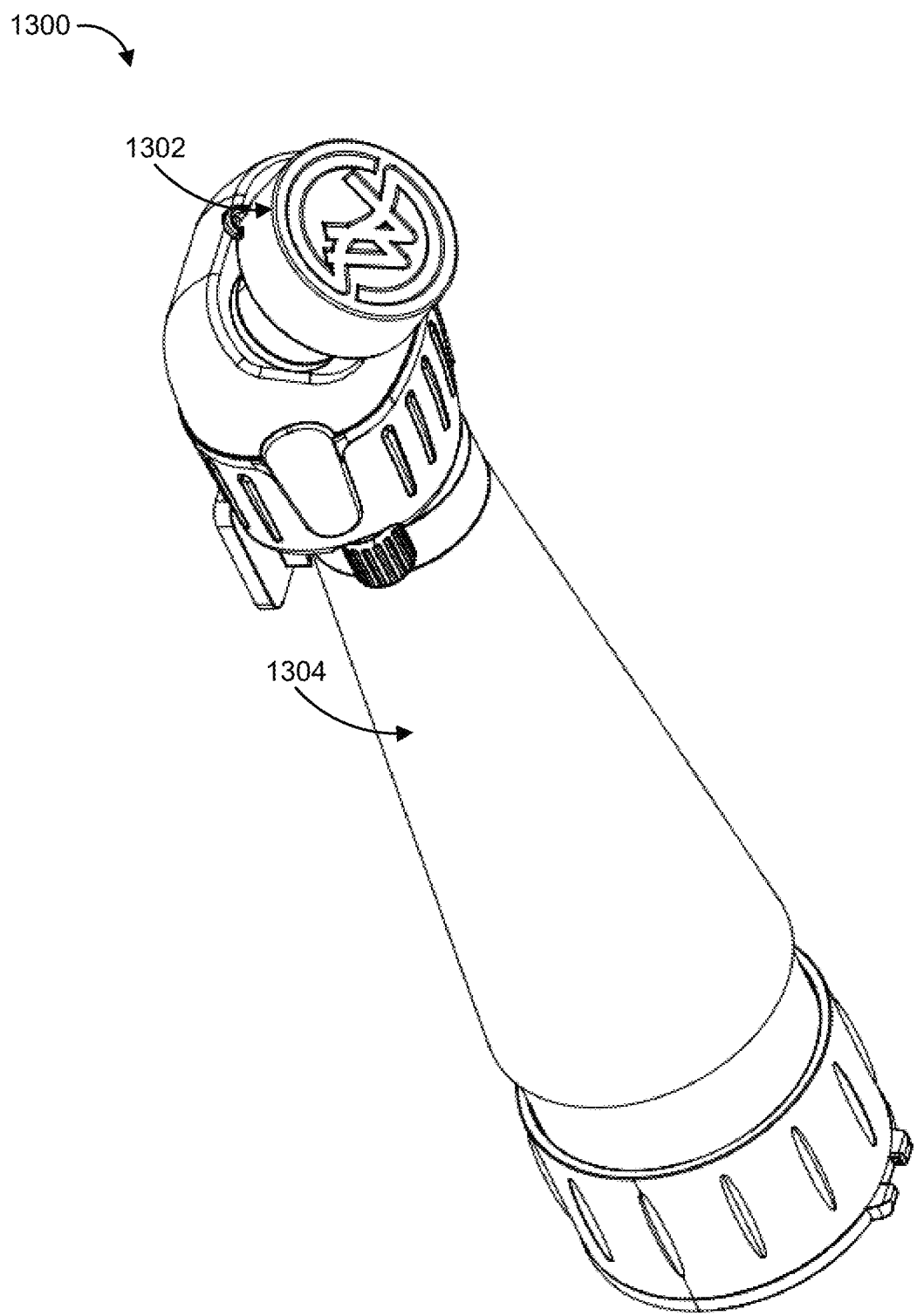
FIG. 13 is an assembled view of one embodiment of an optical instrument, an adapter, and a cap.

FIG. 13 is an assembled view illustrating one embodiment 1300 of a combined adapter, cap 1302, and optical instrument 1304. In one embodiment, a cap 1302 is coupled with an adapter, which is mounted to the eyepiece of an optical instrument 1304, using magnets as described above.

Figure 14:
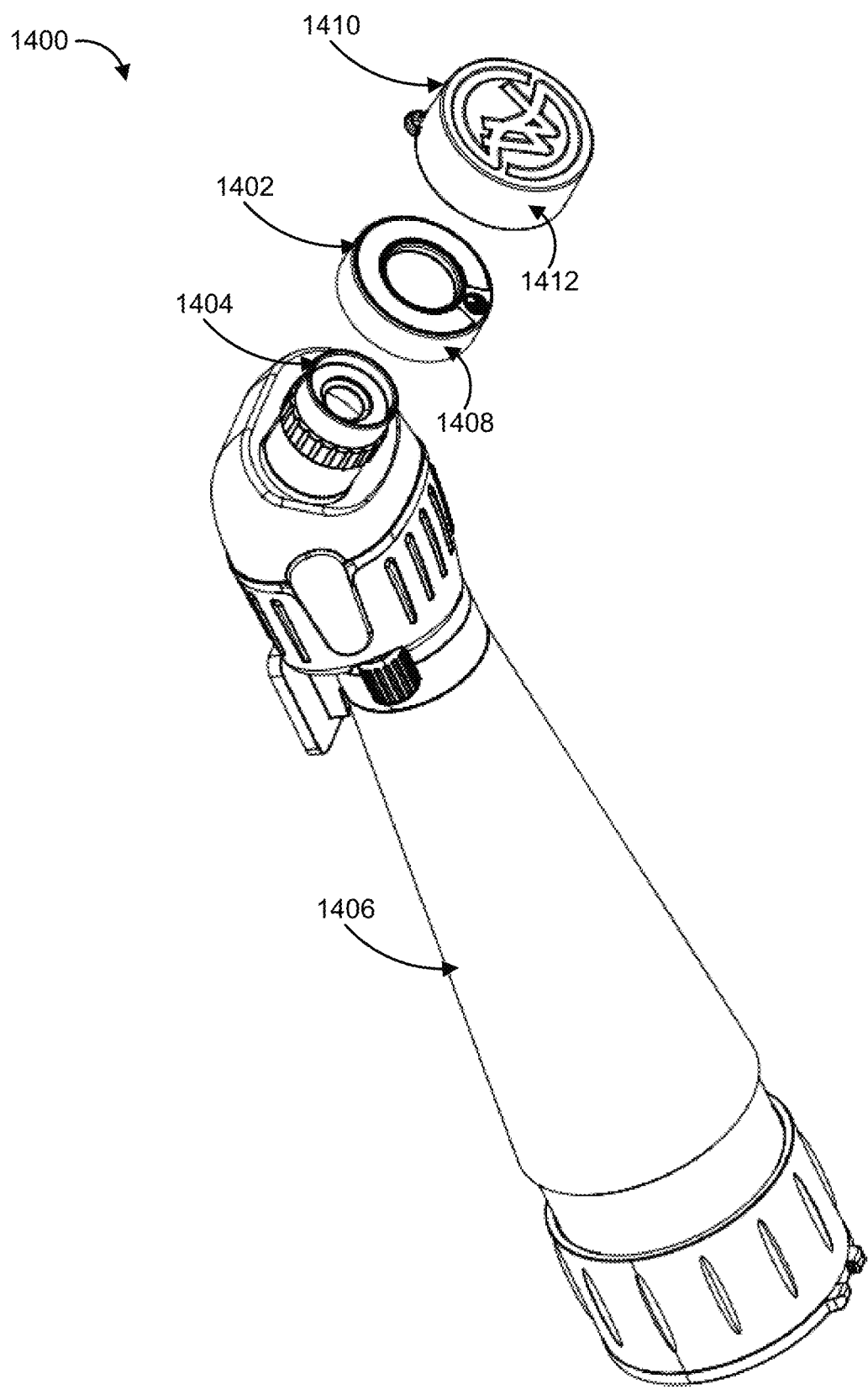
FIG. 14 is an exploded view of one embodiment of an optical instrument, an adapter, and a cap.

FIG. 14 is an exploded view illustrating one embodiment 1400 of a combined adapter 1402, cap 1410, and optical instrument 1406. In one embodiment, an adapter 1402 interfaces with the eyepiece 1404 of an optical instrument 1406. An adapter lip or sidewall 1408, in one embodiment, serves to both couple the adapter 1402 to the optical instrument 1406 as a friction fit and keep errant light from entering the eyepiece 1404. In other embodiments, the friction fit purpose of the lip or sidewall 1408 may be substituted for a different method of coupling. This may include a snap fit, a screw on fit, a magnetic force, an adhesive, hook and loop fasteners, or any other means of sturdy attachment.

In one embodiment, a cap 1410 interfaces with an adapter 1402. A cap lip or sidewall 1412 typically extends far enough to encompass the adapter 1402. In certain embodiments, the cap 1410 and the cap lip or sidewall 1412 typically form a protective case around the adapter 1402.

Figure 15:
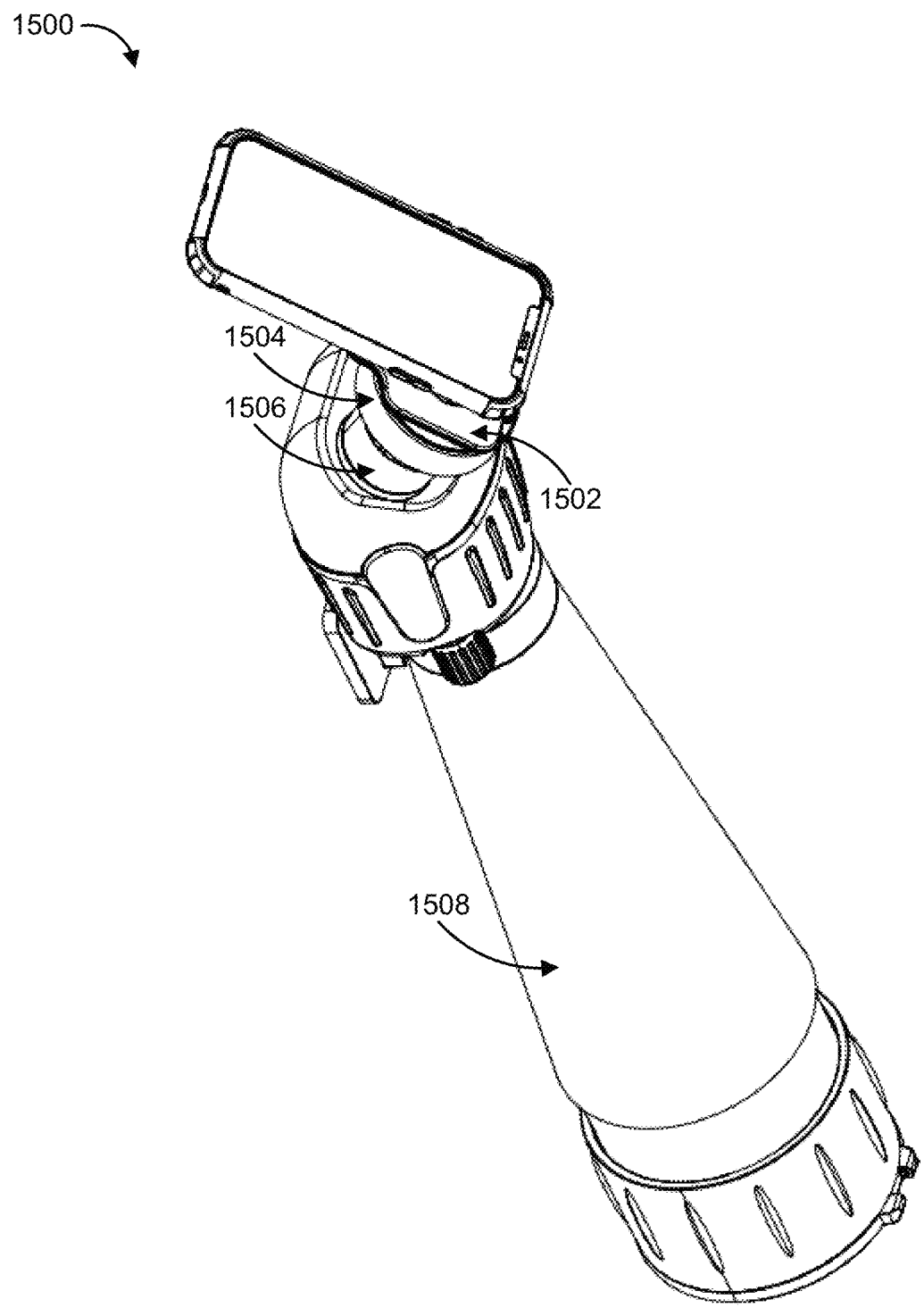
FIG. 15 is an assembled view of one embodiment of an optical instrument, an adapter, and a phone tab assembly.

FIG. 15 is an assembled view illustrating one embodiment 1500 of a combined tab 1502, adapter 1504, and optical instrument 1508. In one embodiment, a tab 1502 is coupled to an adapter 1504, e.g., using magnets as described above to secure the tab 1502 (and ultimately the camera device) to the adapter 1504, which is mounted to the eyepiece 1506 of an optical instrument 1508.

Figure 16:
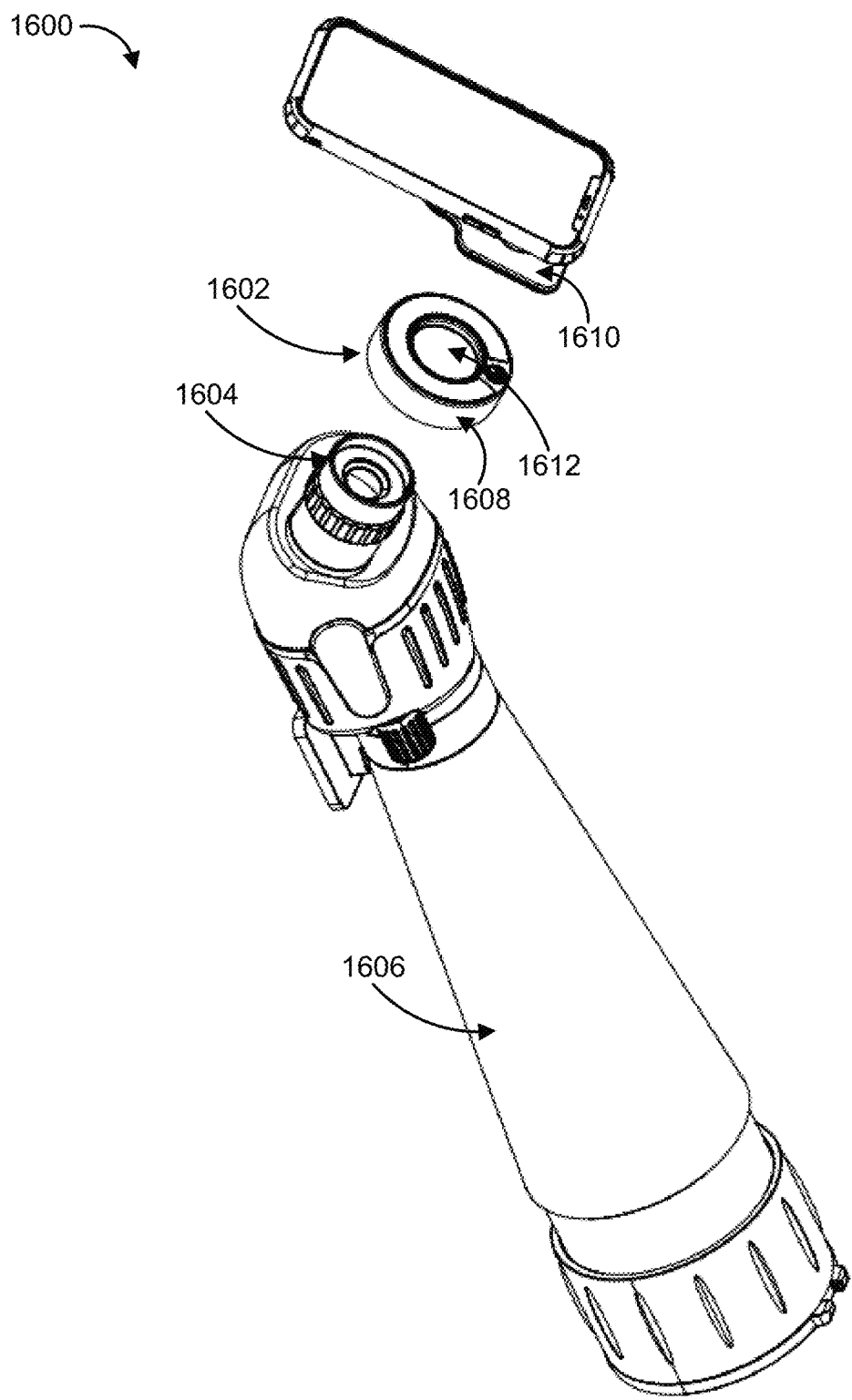
FIG. 16 is an exploded view of one embodiment of an optical instrument, an adapter, and a phone tab assembly.

FIG. 16 is an exploded view illustrating one embodiment 1600 of a combined tab 1610, adapter 1602, and optical instrument 1606. In one embodiment, an adapter 1602 interfaces with the eyepiece 1604 of an optical instrument 1606. An adapter lip or sidewall 1608, in one embodiment, serves to both couple the adapter 1602 to the optical instrument 1606 as a friction fit and keep errant light from entering the eyepiece 1604. In other embodiments, the friction fit purpose of the lip or sidewall 1608 may be substituted for a different method of coupling. This may include a snap fit, a screw on fit, a magnetic force, an adhesive, hook and loop fasteners, or any other means of sturdy attachment.

In one embodiment, a tab 1610 interfaces with an adapter 1602, e.g., using magnets as described above to secure the tab 1610 (and ultimately the camera device) to the adapter 1602. The adapter 1602, in one embodiment, contains an opening or aperture 1612 that, when the adapter 1602 is mounted to the eyepiece 1604, substantially aligns with the optical instrument lens allowing the attached tab 1602 and camera lens to also be aligned.

Figure 17:
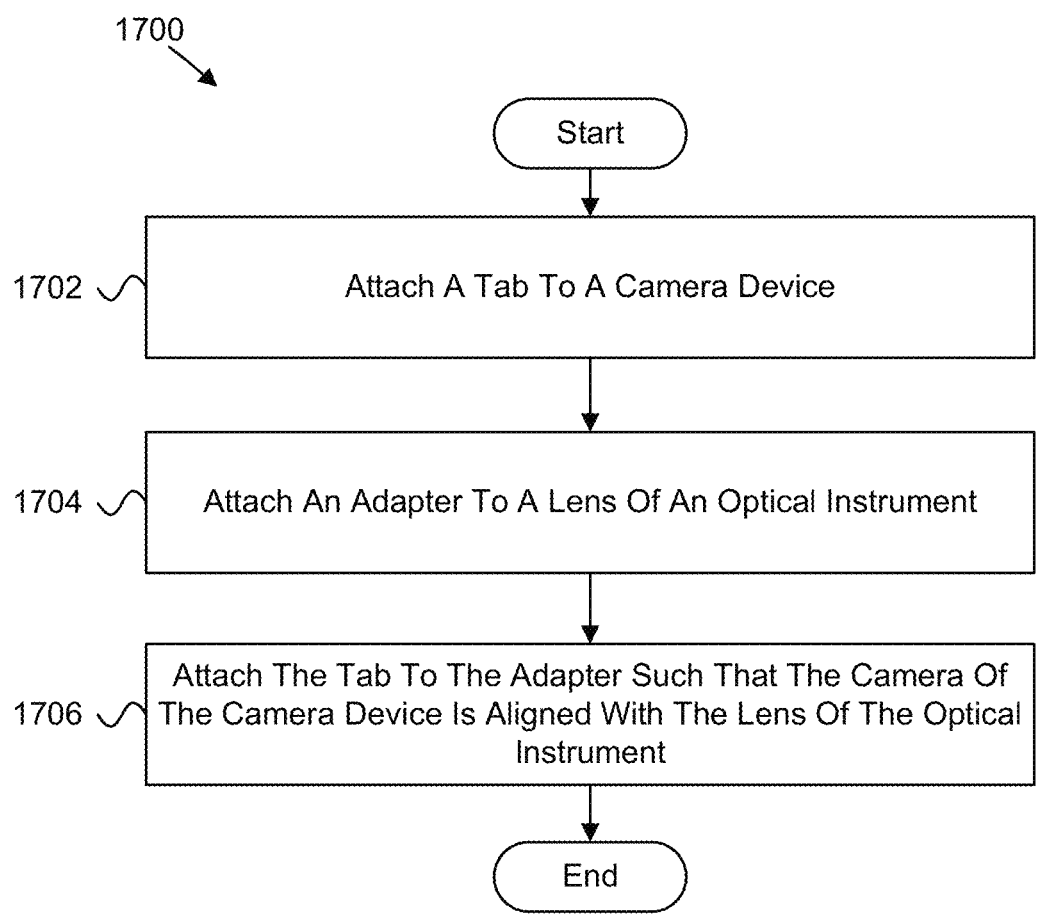
FIG. 17 is a schematic flow chart diagram illustrating one embodiment of a method for using a camera lens to optical instrument connector.

FIG. 17 depicts a flow chart diagram for one embodiment of a method 1700 for use of a camera lens to optical instrument connector. In one embodiment, the method 1700 begins and attaches 1705 a tab to a camera device. In one embodiment, the method 1700 attaches 1710 an adapter to an eyepiece of an optical instrument. In one embodiment, the method 1700 attaches 1715 the tab to the adapter such that the camera of the camera device is aligned with the lens of the optical instrument, and the method 1700 ends.

In one embodiment, an apparatus includes a tab comprising a tab body comprising a first side, a second side, and an aperture through the first side and the second side, one or more magnets located within the tab body positioned between the first side and the second side, and a means for connecting the first side to a device such that a camera lens of the device is aligned with the tab aperture. In one embodiment, the apparatus includes an adapter comprising an adapter body comprising a first side, a second side, and an aperture through the first side and the second side, one or more magnets positioned within the adapter body, the one or more adapter magnets aligned with the one or more tab magnets for magnetically securing the tab to the adapter, and an adapter sidewall protruding along an axis perpendicular to an edge of the first side for securing the adapter onto an eyepiece of a lensed optical instrument such that the lens of the optical instrument is aligned with the adapter's aperture.

In one embodiment, the tab magnets and the adapter magnets are evenly spaced relative to one another within the tab body and the adapter body, respectively.

In one embodiment, the tab magnets and the adapter magnets are located proximate to an outer edge of the tab body and the adapter body, respectively.

In one embodiment, the tab magnets are substantially equidistant from the center of the tab aperture and the adapter magnets are substantially equidistant from the center of the adapter aperture.

In one embodiment, the tab and the adapter each comprise four magnets within the tab body and the adapter body, respectively.

In one embodiment, the apparatus includes an adapter insert for the adapter, the adapter insert having a shape and a size that corresponds to a size of the eyepiece of the lensed optical instrument, the adapter insert comprising one or more tab elements that fit into one or more slots in the adapter sidewall for selectively securing the adapter insert into the adapter.

In one embodiment, the adapter insert is swappable with other adapter inserts to allow the adapter to couple to different sized eyepieces of lensed optical instruments without changing a size of the adapter.

In one embodiment, the apparatus includes a plurality of snaps on the first side of the tab body for connecting the tab to a device using corresponding snap receiving means positioned on the device.

In one embodiment, the device comprises more snap receiving means than the plurality of snaps on the first side of the tab body such that the tab may be attached to the device at various positions corresponding to different cameras of the device.

In one embodiment, the tab and the adapter comprise recesses within the tab body and the adapter body that the tab magnets and the adapter magnets, respectively, are seated in.

In one embodiment, the means of connecting the first side of the tab to the device is selected from the group comprising one or more of an adhesive, a friction fit, a snap fit, a screw on fit, hook and loop fasteners, and a magnetic force.

In one embodiment, a system includes a tab comprising a tab body comprising a first side, a second side, and an aperture through the first side and the second side, one or more magnets located within the tab body positioned between the first side and the second side, and a means for connecting the first side to a device such that a camera lens of the device is aligned with the tab aperture. In one embodiment, the apparatus includes an adapter comprising an adapter body comprising a first side, a second side, and an aperture through the first side and the second side, one or more magnets positioned within the adapter body, the one or more adapter magnets aligned with the one or more tab magnets for magnetically securing the tab to the adapter, and an adapter sidewall protruding along an axis perpendicular to an edge of the first side for securing the adapter onto an eyepiece of the lensed optical instrument such that the lens of the optical instrument is aligned with the adapter's aperture.

In one embodiment, the system includes a cap comprising a cap body configured to cover the first side of the adapter, the cap body comprising an exterior surface and an interior surface and a cap sidewall protruding along an axis perpendicular to an edge of the cap's interior surface that corresponds to the adapter sidewall such that the cap receives and conceals the adapter when connected and one or more magnets embedded within the cap body, the one or more cap magnets aligned with the one or more adapter magnets to magnetically secure the cap to the adapter.

In one embodiment, the tab is coupled to the adapter by aligning the tab magnets with the adapter magnets and the cap is coupled to the adapter by aligning the cap magnets with the adapter magnets.

In one embodiment, the cap substantially covers the adapter to form a protective shell around the adapter when the cap and adapter are coupled.

In one embodiment, the cap comprises a non-slip elastomer disposed on its inner surface.

In one embodiment, the first side of the adapter further comprises non-slip elastomer disposed on its surface.

In one embodiment, the system includes an adapter insert for the adapter, the adapter insert having a shape and a size that corresponds to a size of the eyepiece of the lensed optical instrument, the adapter insert comprising one or more tab elements that fit into one or more slots in the adapter sidewall for selectively securing the adapter insert into the adapter.

In one embodiment, the system includes a plurality of snaps on the first side of the tab body for connecting the tab to a device using corresponding snap receiving means positioned on the device.

In one embodiment, a digiscoping system includes a tab comprising a tab body comprising a first side, a second side, and an aperture through the first side and the second side, the first side comprising a plurality of snaps to connect with corresponding snap receiving means positioned on a device, the device comprising more snap receiving means than the plurality of snaps on the first side of the tab such that the tab may be attached to the device at various positions corresponding to different cameras of the device and one or more magnets located within the tab body positioned between the first side and the second side.

In one embodiment, the digiscoping system includes an adapter comprising an adapter body comprising a first side, a second side, and an aperture through the first side and the second side, one or more magnets positioned within the adapter body, the one or more adapter magnets aligned with the one or more tab magnets for magnetically securing the tab to the adapter, an adapter sidewall protruding along an axis perpendicular to an edge of the first side for securing the adapter onto an eyepiece of a lensed optical instrument such that the lens of the optical instrument is aligned with the adapter's aperture, one or more slots opposing one another in the adapter sidewall, and an adapter insert having a shape and a size that corresponds to a size of the eyepiece of the lensed optical instrument, the adapter insert comprising one or more tab elements that fit into the one or more slots in the adapter sidewall for selectively securing the adapter insert into the adapter, wherein the adapter insert is swappable with other adapter inserts to allow the adapter to couple to different sized eyepieces of lensed optical instruments without changing a size of the adapter.

In one embodiment, the digiscoping system includes a cap comprising a cap body configured to cover the first side of the adapter, the cap body comprising an exterior surface, an interior surface, and a cap sidewall protruding along an axis perpendicular to an edge of the cap's interior surface that corresponds to the adapter sidewall such that the cap receives and conceals the adapter when connected and one or more magnets embedded within the cap body, the one or more cap magnets aligned with the one or more adapter magnets to magnetically secure the cap to the adapter.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a tab comprising:
   a first aperture;
   a first plurality of magnets located around the first aperture;
   a guide element surrounding the first aperture; and
   a means for connecting the tab to a device such that a camera lens of the device is aligned with the first aperture; and
an adapter comprising:
   a second aperture;
   a second plurality of magnets located around the second aperture; and
   a means for connecting the adapter to an optical instrument such that a lens of the optical instrument is aligned with the second aperture,
wherein the first plurality of magnets and the second plurality of magnets are configured such that the camera lens of the device is aligned with a lens of the optical instrument using the guide element when the tab is magnetically coupled to the adapter.

2. The apparatus of claim 1, wherein the first plurality of magnets and the second plurality of magnets are evenly spaced relative to one another.

3. The apparatus of claim 1, wherein the first plurality of magnets and the second plurality of magnets are exposed.

4. The apparatus of claim 1, wherein the first plurality of magnets are substantially equidistant from a center of the first aperture and the second plurality of magnets are substantially equidistant from a center of the second aperture.

5. The apparatus of claim 1, wherein the first plurality of magnets and the second plurality of magnets each comprise at least eight magnets.

6. The apparatus of claim 1, further comprising an adapter insert for the adapter, the adapter insert having a shape and a size that corresponds to a size of an eyepiece of the optical instrument, the adapter insert comprising one or more tab elements that fit into one or more slots in the adapter for selectively securing the adapter insert into the adapter.

7. The apparatus of claim 6, wherein the adapter insert is swappable with other adapter inserts to allow the adapter to couple to different sized eyepieces of optical instruments without changing a size of the adapter.

8. The apparatus of claim 1, wherein the means for connecting the tab to a device comprises at least one magnet.

9. The apparatus of claim 1, wherein the tab and the adapter comprise recesses that the first plurality of magnets and the second plurality of magnets, respectively, are seated in.

10. A system, comprising:
a tab comprising:
   a first aperture;
   a first plurality of magnets located around the first aperture;
   a guide element surrounding the first aperture; and a means for connecting the tab to a device such that a camera lens of the device is aligned with the first aperture; and an adapter comprising:
  a second aperture;
  a second plurality of magnets located around the second aperture; and
  a means for connecting the adapter to an optical instrument such that a lens of the optical instrument is aligned with the second aperture,
  wherein the first plurality of magnets and the second plurality of magnets are configured such that the camera lens of the device is aligned with a lens of the optical instrument using the guide element when the tab is magnetically coupled to the adapter; and a cap configured to cover the first aperture or the second aperture, the cap comprising a third plurality of magnets that are aligned with the first plurality of magnets or the second plurality of magnets and configured to secure the cap to the tab or the adapter.

11. The system of claim 10, wherein the cap substantially covers the first aperture or the second aperture.

12. The system of claim 10, further comprising an adapter insert for the adapter, the adapter insert having a shape and a size that corresponds to a size of an eyepiece of the lensed optical instrument, the adapter insert comprising one or more tab elements that fit into one or more slots in the adapter for selectively securing the adapter insert into the adapter.

13. The system of claim 10, wherein the cap comprises a connector.

14. The system of claim 10, wherein each of the first plurality of magnets, the second plurality of magnets, and the third plurality of magnets are evenly spaced relative to one another.

15. The system of claim 10, wherein the first plurality of magnets, the second plurality of magnets, and the third plurality of magnets are exposed.

16. The system of claim 10, wherein the means for connecting the tab to a device comprises at least one magnet.

17. The system of claim 10, wherein the first plurality of magnets and the second plurality of magnets each comprise at least eight magnets.

18. The system of claim 10, wherein the first plurality of magnets are substantially equidistant from a center of the first aperture and the second plurality of magnets are substantially equidistant from a center of the second aperture.

19. A method, comprising:
  coupling a tab to a device such that a camera lens of the device is aligned with a aperture of the tab, wherein the tab comprises a first plurality of magnets and a guide element surrounding the aperture of the tab;
  coupling an adapter to an optical instrument such that a lens of the optical instrument is aligned with an aperture of the adapter, wherein the adapter comprises a second plurality of magnets located around the aperture of the adapter; and
  magnetically coupling the tab to the adapter using the first plurality of magnets and the second plurality of magnets such that the camera lens of the device is aligned with a lens of the optical instrument using the guide element.

20. The method of claim 19, further comprising coupling a cap to the tab or the adapter, the cap configured to cover the aperture of the tab or the aperture of the adapter, the cap comprising a third plurality of magnets that are aligned with the first plurality of magnets or the second plurality of magnets and configured to secure the cap to the tab or the adapter.

\* \* \* \* \*